(12) United States Patent
Augustine et al.

(10) Patent No.: US 7,933,296 B2
(45) Date of Patent: Apr. 26, 2011

(54) SERVICES FOR DATA SHARING AND SYNCHRONIZATION

(75) Inventors: Matthew S. Augustine, Seattle, WA (US); Arnold N. Blinn, Hunts Point, WA (US); John D. Elliott, Snohomish, WA (US); Don M. Gillett, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/681,321

(22) Filed: Mar. 2, 2007

(65) Prior Publication Data

US 2008/0212616 A1 Sep. 4, 2008

(51) Int. Cl.
*H04J 3/06* (2006.01)

(52) U.S. Cl. ........ 370/503; 370/507; 707/713; 707/806; 709/203; 709/217; 709/231

(58) Field of Classification Search ............... 707/104.1, 707/10, 100, 201, 203; 370/503, 507; 709/217, 709/231
See application file for complete search history.

(56) References Cited

U.S. PATENT DOCUMENTS

| 5,261,080 | A | 11/1993 | Khoyi |
| 5,392,386 | A | 2/1995 | Chalas |
| 5,579,521 | A | 11/1996 | Shearer et al. |
| 5,625,809 | A | 4/1997 | Dysart et al. |
| 5,752,254 | A | 5/1998 | Sakairi |
| 5,781,908 | A | 7/1998 | Williams et al. |
| 5,899,996 | A | 5/1999 | Dysart et al. |
| 5,924,099 | A | 7/1999 | Guzak et al. |
| 5,926,633 | A | 7/1999 | Takagi et al. |
| 5,964,834 | A | 10/1999 | Crutcher |
| 5,974,238 | A | 10/1999 | Chase, Jr. |
| 6,091,731 | A | 7/2000 | Biegaj et al. |
| 6,202,100 | B1 | 3/2001 | Maltby et al. |
| 6,295,541 | B1 | 9/2001 | Bodnar et al. |
| 6,338,084 | B1 | 1/2002 | Rankin et al. |
| 6,460,089 | B1 | 10/2002 | Romano et al. |
| 6,490,634 | B2 | 12/2002 | Coiner |
| 6,532,474 | B2 | 3/2003 | Iwamoto et al. |
| 6,549,922 | B1 | 4/2003 | Srivastava et al. |
| 6,553,037 | B1 | 4/2003 | Pivowar et al. |
| 6,591,295 | B1 | 7/2003 | Diamond et al. |
| 6,675,213 | B1 | 1/2004 | Schmonsees |
| 6,721,951 | B1 | 4/2004 | Williams et al. |
| 6,760,728 | B1 | 7/2004 | Osborn |

(Continued)

FOREIGN PATENT DOCUMENTS

EP 0597575 12/1999

(Continued)

OTHER PUBLICATIONS

"Simple Sharing Extensions for RSS and OPML", http://msdn.microsoft.com/xml/rss/sse/.

(Continued)

*Primary Examiner* — Ricky Ngo
*Assistant Examiner* — Rasheed Gidado

(57) ABSTRACT

Systems and methods for sharing and synchronizing data using the addition of synchronization data to a feed that contains data items, and at least a node or endpoint that provides synchronization-related services to other endpoints, are disclosed. Such systems and methods, and client and service endpoints, may use the added synchronization data in multiple ways to share data, incorporate changes consistently, and resolve conflicts.

20 Claims, 10 Drawing Sheets

U.S. PATENT DOCUMENTS

| | | | |
|---|---|---|---|
| 6,912,690 | B2 | 6/2005 | Bauchot |
| 6,983,328 | B2 | 1/2006 | Beged-Dov et al. |
| 6,986,105 | B2 | 1/2006 | Walker, Jr. |
| 6,993,522 | B2 | 1/2006 | Chen et al. |
| 7,003,546 | B1 | 2/2006 | Cheah |
| 7,013,316 | B1 | 3/2006 | Hansen et al. |
| 7,130,924 | B2 | 10/2006 | Bartlett et al. |
| 7,725,456 | B2 | 5/2010 | Augustine |
| 2002/0007380 | A1 | 1/2002 | Bauchot et al. |
| 2002/0073204 | A1 | 6/2002 | Dutta et al. |
| 2002/0133508 | A1* | 9/2002 | LaRue et al. ............... 707/202 |
| 2002/0138653 | A1 | 9/2002 | Ogura |
| 2002/0143997 | A1* | 10/2002 | Huang et al. ............... 709/248 |
| 2003/0105831 | A1 | 6/2003 | O'Kane |
| 2003/0142134 | A1 | 7/2003 | Bates |
| 2003/0220966 | A1* | 11/2003 | Hepper et al. ............ 709/203 |
| 2004/0153974 | A1 | 8/2004 | Walker, Jr. |
| 2004/0172423 | A1 | 9/2004 | Kaasten et al. |
| 2004/0172584 | A1 | 9/2004 | Jones |
| 2004/0205470 | A1 | 10/2004 | Jones et al. |
| 2004/0210846 | A1 | 10/2004 | Olsen |
| 2004/0226012 | A1 | 11/2004 | Awada |
| 2004/0250215 | A1 | 12/2004 | Chen |
| 2005/0038811 | A1 | 2/2005 | Pivowar et al. |
| 2005/0050054 | A1 | 3/2005 | Clark et al. |
| 2005/0066335 | A1 | 3/2005 | Aarts |
| 2005/0091603 | A1 | 4/2005 | Chen et al. |
| 2005/0117606 | A1 | 6/2005 | Kim |
| 2005/0138122 | A1 | 6/2005 | Boehringer et al. |
| 2005/0155017 | A1 | 7/2005 | Berstis et al. |
| 2005/0165615 | A1 | 7/2005 | Minar |
| 2005/0172296 | A1 | 8/2005 | Schleifer et al. |
| 2005/0182792 | A1 | 8/2005 | Israel |
| 2005/0198299 | A1 | 9/2005 | Beck et al. |
| 2005/0203905 | A1 | 9/2005 | Jung et al. |
| 2005/0203935 | A1 | 9/2005 | McArdle |
| 2005/0289265 | A1 | 12/2005 | Illowsky et al. |
| 2006/0004600 | A1 | 1/2006 | Summer et al. |
| 2006/0010204 | A1 | 1/2006 | Jalava et al. |
| 2006/0028396 | A1* | 2/2006 | Starbuck et al. ............ 345/2.1 |
| 2006/0041893 | A1 | 2/2006 | Castro et al. |
| 2006/0095507 | A1 | 5/2006 | Watson |
| 2006/0106879 | A1 | 5/2006 | Zondervan et al. |
| 2006/0123010 | A1 | 6/2006 | Landry et al. |
| 2006/0129907 | A1 | 6/2006 | Volk et al. |
| 2006/0129917 | A1 | 6/2006 | Volk et al. |
| 2006/0143459 | A1 | 6/2006 | Villaron et al. |
| 2006/0150004 | A1 | 7/2006 | Mizutani |
| 2006/0155821 | A1 | 7/2006 | Pichetti et al. |
| 2006/0173985 | A1 | 8/2006 | Moore |
| 2006/0184617 | A1 | 8/2006 | Nicholas et al. |
| 2006/0212792 | A1 | 9/2006 | White et al. |
| 2006/0215215 | A1 | 9/2006 | Kumaran |
| 2006/0217126 | A1 | 9/2006 | Sohm et al. |
| 2006/0218492 | A1 | 9/2006 | Andrade |
| 2006/0225137 | A1 | 10/2006 | Odins-Lucas et al. |
| 2006/0230021 | A1 | 10/2006 | Diab et al. |
| 2006/0230345 | A1 | 10/2006 | Weng et al. |
| 2006/0242327 | A1 | 10/2006 | Knight et al. |
| 2006/0242549 | A1 | 10/2006 | Schweier et al. |
| 2006/0247961 | A1 | 11/2006 | Klemow |
| 2006/0253489 | A1 | 11/2006 | Kahn et al. |
| 2006/0265396 | A1 | 11/2006 | Raman et al. |
| 2006/0265409 | A1 | 11/2006 | Neumann et al. |
| 2006/0265518 | A1 | 11/2006 | Owens et al. |
| 2006/0282822 | A1 | 12/2006 | Weng |
| 2006/0288053 | A1* | 12/2006 | Holt et al. ............... 707/203 |
| 2006/0288329 | A1 | 12/2006 | Gandhi et al. |
| 2007/0022174 | A1 | 1/2007 | Issa |
| 2007/0100960 | A1 | 5/2007 | Eichstaedt et al. |
| 2007/0136443 | A1 | 6/2007 | Sah et al. |
| 2007/0162517 | A1 | 7/2007 | Teegan et al. |
| 2007/0168461 | A1* | 7/2007 | Moore ............... 709/217 |
| 2007/0294366 | A1* | 12/2007 | Ozzie et al. ............... 709/217 |
| 2008/0046471 | A1* | 2/2008 | Moore et al. ............ 707/104.1 |
| 2008/0126364 | A1* | 5/2008 | Khosravy et al. ........... 707/100 |
| 2008/0144669 | A1* | 6/2008 | Lee et al. ............... 370/503 |
| 2008/0155112 | A1* | 6/2008 | Ma et al. ............... 709/231 |
| 2008/0195739 | A1 | 8/2008 | Ozzie et al. |
| 2008/0243874 | A1 | 10/2008 | Suthar et al. |
| 2008/0267221 | A1 | 10/2008 | Ozzie et al. |

FOREIGN PATENT DOCUMENTS

| | | |
|---|---|---|
| WO | WO-0073902 | 12/2000 |
| WO | WO-03030475 | 4/2003 |

OTHER PUBLICATIONS

Antoniu, et al., "JUXMEM: An Adaptive Supportive Platform for Data Sharing on the Grid", Date: Sep. 2003. 24 Pages.

Chmielewski, et al., "A Distributing Platform for Archiving and Retrieving RSS Feeds", Date: 2005. 6 Pages.

"JuxMem: An Adaptive Supportive Platform for Data Sharing on the Grid", retrieved at <<ftp://ftp.inria.fr/INRIA/tech-reports/publi-pdf/RR/RR-4917.pdf>>.

"A Distributed Platform for Archiving and Retrieving RSS Feeds", retrieved at <<http://ieeexplore.ieee.org/iel5/10154/32462/01515404.pdf?isNumber=>>.

Ken Rimey, "Version Headers for Flexible Synchronization and Conflict Resolution", retrieved at <<http://www.hiit.fi/publications/pub_files/hiit-2004-3.pdf>>, Nov. 22, 2004.

Leonard Kawell Jr, et al., "Replicated Document Management in a Group Communication System", retrieved at <<http://delivery.acm.org/10.1145/1030000/1024798/p395-kawell.pdf?key1=1024798&key2=1402853611&coll=GUIDE&dl=GUIDE&CFID=6163663&CFTOKEN=68289132>>, Portland, Or., Sep. 26-28, 1998.

"Microsoft Team RSS Blog; Simple Sharing Extensions for RSS and OPML", retrieved at << http://blogs.msdn.com/rssteam/archive/2005/12/01/498704.aspx>>, Dec. 1, 2005.

Benoit Marchal, "Working XML: Expand RSS capabilities with RSS extensions", retrieved at <<http://www-128.ibm.com/developerworks/xml/library/x-wxxm36.html>>, Aug. 15, 2006.

Vadim Zaliva, et al., "Enhanced "enclosures" support in RSS and ATOM Syndication", retrieved at <<http://www.crocodile.org/lord/RSSenclosures/RSSenclosures.pdf>>, Dec. 15, 2004.

"Atom Enabled; What is Atom?", retrieved at <<http://atomenabled.org>>, Apr. 5, 2007.

J. Gregorio, et al., "The Atom Publishing Protocol", retrieved at <<http://www.ietf.org/internet-drafts/draft-ietf-atompub-protocol-14.txt>>, Mar. 4, 2007; Copyright The IETF Trust 2007.

"Front Page Atom Wiki; The Atom Project", retrieved at <<http://intertwingly.net/wiki/pie/FrontPage>>, Apr. 5, 2007.

Dave Winer, "RFC: MetaWeblog API", retrieved at <<http://www.xmlrpc.com/metaWeblogApi>>, Mar. 14, 2002.

"Google Data API's (Beta) Developers Guide: Google Data API's Overview", retrieved at <<http://code.google.com/apis/gdata/overview.html>>, Apr. 5, 2007.

Ray Ozzie, "Blog; Really Simple Sharing", retrieved at <<http://rayozzie.spaces.live.com/blog/cns!FB3017FBB9B2E142!175.entry>>.

Zimbra, "A Pint of Ale—Ajax Linking and Embedding", retrieved at <<http://www.zimbra.com/blog/archives/2006/04/zumbra_ale-ajax_linking_and_embedding.html>>, Apr. 3, 2006.

Dion Hinchcliffe, "How Simple Sharing Extensions Will Change the Web", retrieved at << http://web2.wsj2.com/how_simple_sharing_extensions_will_change_the_web.htm>>.

"MSDN; Frequently Asked Questions For Simple Sharing Extensions (SSE)", retrieved at <<http://msdn.microsoft.com/xml/rss/ssefaq/>>, Copyright 2006 Microsoft Corporation.

"Microsoft Team RSS Blog, SSE Update and Tutorial", retrieved at http://blogs.msdn.com/rssteam/archive/2006/01/25/517473.aspx>>, Jan. 25, 2006.

"Microsoft Team RSS Blog, More on SSE", retrieved at <<http://blogs.msdn.com/rssteam/archive/2005/12/07/501326.aspx>>, Dec. 7, 2005.

Cori Shlegel, "Simple Sharing Extensions Up Close", retrieved at <<http://kinrowan.net/blog/wp/archives/2005/11/23/sse-up-close>>.

Jon Udell, "Dueling Simplicities", retrieved at <<http://weblog.infoworld.com/udell/2005/11/22.html>>, Nov. 22, 2005.

Ozzie, et al., "Simple Sharing Extensions for Atom and RSS", retrieved at <<http://msdn.microsoft.com/en-us/xml/bb510102.aspx>>, Version: 0.93, Updated: May 7, 2007, Change log: 0.93—May 7, 2007.

"Attensa Feed Server—Secure, Scalable Web Feed Server", http://attensa.com/products/server/; Dec. 14, 2006.

"Clipboard", http://msdn.microsoft.com/library/default.asp?url=/library/en-us/winui/winui/windowsuserinterface/dataexchange/clipboard.asp; Copyright 2006 Microsoft Corporation.

"Clipboard: Adding Other Formats", *Microsoft Corporation, MFC Library Reference*; http://msdn2.microsoft.com/en-us/library/838a3whf(VS.80).aspx; Nov. 16, 2006.

"Ektron CMS200", http://www.ektron.com/manuals/datasheets/EktronCMS200-datasheet.pdf; Dec. 14, 2006.

"Enterprise RSS the Center of Attention", http://attensa.typepad.com/attensa/files/attensa_enterprise_rss-whitepaper_0605.pdf; Dec. 14, 2006.

"Live Clipboard—Wiring the Web", http://liveclipboard.org/; Mar. 2007.

"Live Clipboard Example", http://spaces.live.com/editorial/rayozzie/demo/liveclip/liveclipsample/clipboardexample.html; Mar. 2007.

"Live Clipboard Screencasts", http://spaces.live.com/editorial/rayozzie/demo/liveclip/screencast/liveclipdemo.html; Dec. 14, 2006.

"Live Clipboard Technical Introduction", http://spaces.live.com/editorial/rayozzie/demo/liveclip/liveclipsample/techpreview.html; Nov. 2, 2006.

"LiveShare Plus", *PictureTel Corporation*; http://ww.polycom.com/common/pw_cmp_updateDocKeywords/0,1687,573,00.pdf ;1997.

"RSSOwl / RSS / RDF/ Atom Newsreader", http://dirfile.corn/rssowl_rss_rdf_atom_newsreader.htm Feb. 1, 2007.

"Snarfer", http://www.snarfware.com/download.htm; Dec. 14, 2006.

"Understanding OLE", *eZine Approach*; http://www.glencoe.com/ps/computered/pas/article.php4?articleld=149; 2001.

"vCard: "The Electronic Business Card"", *A versit Consortium White Paper*, Version 2.1; http://www.imc.org/pdi/veardwhite.html; Jan. 1, 1997.

Apperley, Mark et al., "Breaking the Copy/Paste Cycle: The Stretchable Selection Tool", Hamilton, New Zealand; http://doi.ieeecomputersociety.org/10.1109/AUIC.2000.822057 ; 2000.

Burcham, Bill, "Baby Steps to Synergistic Web App", http://lesscode.org/2005/10/21/baby-steps-to-synergistic-web-apps/; Oct. 21, 2005.

Burcham, Bill, "Half a Baby Step", http://lesscode.org/2005/11/02/half-a-baby-step; Nov. 2, 2005.

Burcham, Bill, "Ray Ozzie Demos Web App Clipboard", http://www.memerocket.com/2006/03/21/ray-ozzie-demos-web-app-clipboard); Mar. 21, 2006.

Burcham, Bill, "Ray Ozzie Got the Memo", http://lessoode.org/2006/03/22/ray-ozzie-got-the-memo/; Mar. 22, 2006.

Cheung, Wai-Leung et al., "Automatic Device Configuration and Data Validation through Mobile Communication", *IEEE*, http://ieeexplore.ieee.org/iel5/8743/27700/01235773.pdf?isNumber=; 2003.

Chudnov, Daniel et al., "Introducing unAPI", *Ariadne Issue 48*; http://www.ariadne.ac.uk/issue48/chudnov-et-al/; Jul. 2006.

Hansen, Frank A. et al., "RSS as a Distribution Medium for Geo-Spatial Hypermedia", *HT '05*: Salzburg, Austria; Copyright 2005 AC; http://portal.acm.org/citation.cfm?id=1083410; Sep. 6-9, 2005.

Miller, Robert C. et al., "Synchronizing Clipboards of Multiple Computers", Copyright 1999 *ACM; Asheville, NC* http://delivery.acm.org/10.1145/330000/322584/p65-miller.pdf?key1 -322584 &key2=9349701611&coll=Guide&dl=Guide&cfid=23570608 &cftoken=92034513 ; 1999.

Nummi, Tomi, "The Technical Infrastructure of the LIVE Project", http://www.edu.heisinki.fi/media/mep6/nummi.pdf; Dec. 14, 2006.

Obasanjo, Dare, "Metadata Quality, Events Databases and Live Clipboard", http://ww.25hoursaday.com/weblog/PermaLink.aspx?guid=91e40df6-c973-4bf7-8eb6-05c778d8cd90;Apr. 3, 2006.

Ozzie, Ray, "Blog; Wiring Progress", http://rayozzie.spaces.live.com/blog/cns!FB3017FBB9B2E1421377.entry?_c11_blogpart_blogpart=blogview&_c=blogpart; Apr. 2001.

Ozzie, Ray, "Blog; Wiring the Web", http://rayozzie.spaces.live.com/blog/cns!FB3017FBB9B2E142!285.entry; Mar. 2007.

Ozzie, Jack et al., "Live Clipboard XML Schema", http://spaces.live.com/editorial/rayozzie/demo/liveclip/specification/v092.html; Apr. 21, 2006.

Ozzie, Jack E. et al., "Simple Sharing Extensions for RSS and OPML", Version 0.91; http://msdn.microsoft.com/xml/rss/sse/; Jan. 12, 2006.

Roisin, Cecile et al., "Implementing the Cut-and-Paste Operation in a Structured Editing System", http://www.oasis-open.org/cover/rois-impl-ps.gz; Mar. 1994.

Spinellis, Diomidis D., "Outwit: Unix Tool-based Programming Meets the Windows World", *USENIX 2000 Technical Conference Proceedings, Berkeley, CA, USENIX Association* In Christopher Small, Editor, http://www.spinellis.gr/pubs/conf2000-Usenix-outwit/html/utool.html; Jun. 2000, pp. 149-158.

Stylos, Jeffrey et al., "Citrine: Providing Intelligent Copy-and-Paste", Pittsburg, PA; Copyright 2004 ACM; Santa Fe, New Mexico; http://www.cs.cmu/~citrine/CitrinePaper.pdf; Oct. 24-27, 2004.

Wittenbrink, Heinz, "RSS and Atom Understanding and Implementing Content Feeds and Syndication", http://www.programmersheaven.com/other/booksamples/pdf/RSS_samplechapter.pdf; Dec. 14, 2006.

Yang, Mao et al., "Deployment of a Large-Scale Peer-to-Peer Social Network", Microsoft Research Asia; Beijing, China http://research.microsoft.com/asia/dload_files/groups/system/maze.pdf; Dec. 14, 2006.

* cited by examiner

SERVICES FOR DATA SHARING AND SYNCHRONIZATION

BACKGROUND

Synchronizing and sharing data between multiple endpoints may be accomplished in a variety of ways. Many synchronization implementations require specific and perhaps not widely-accepted data interchange formats. The same or different synchronization implementations may be relatively complex, for example, in terms of the rules that synchronization endpoints must follow, the data that must be provided and exchanged when synchronizing, and so on. Some synchronization implementations may require particular networking topologies such as, for example, a hub and spoke arrangement; others may operate in a wide variety of topologies including peer-to-peer arrangements, with one or more centralized nodes, and so on.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward sharing and synchronizing data using, in at least some implementations, the addition of synchronization data to a feed that contains data items, and at least one node or endpoint that provides synchronization-related services to other endpoints. The added synchronization data may be used in multiple ways by the service endpoint, as well as by client endpoints, to perform tasks such as incorporating changes in a consistent manner and resolving conflicts.

DETAILED DESCRIPTION

Figure 1:
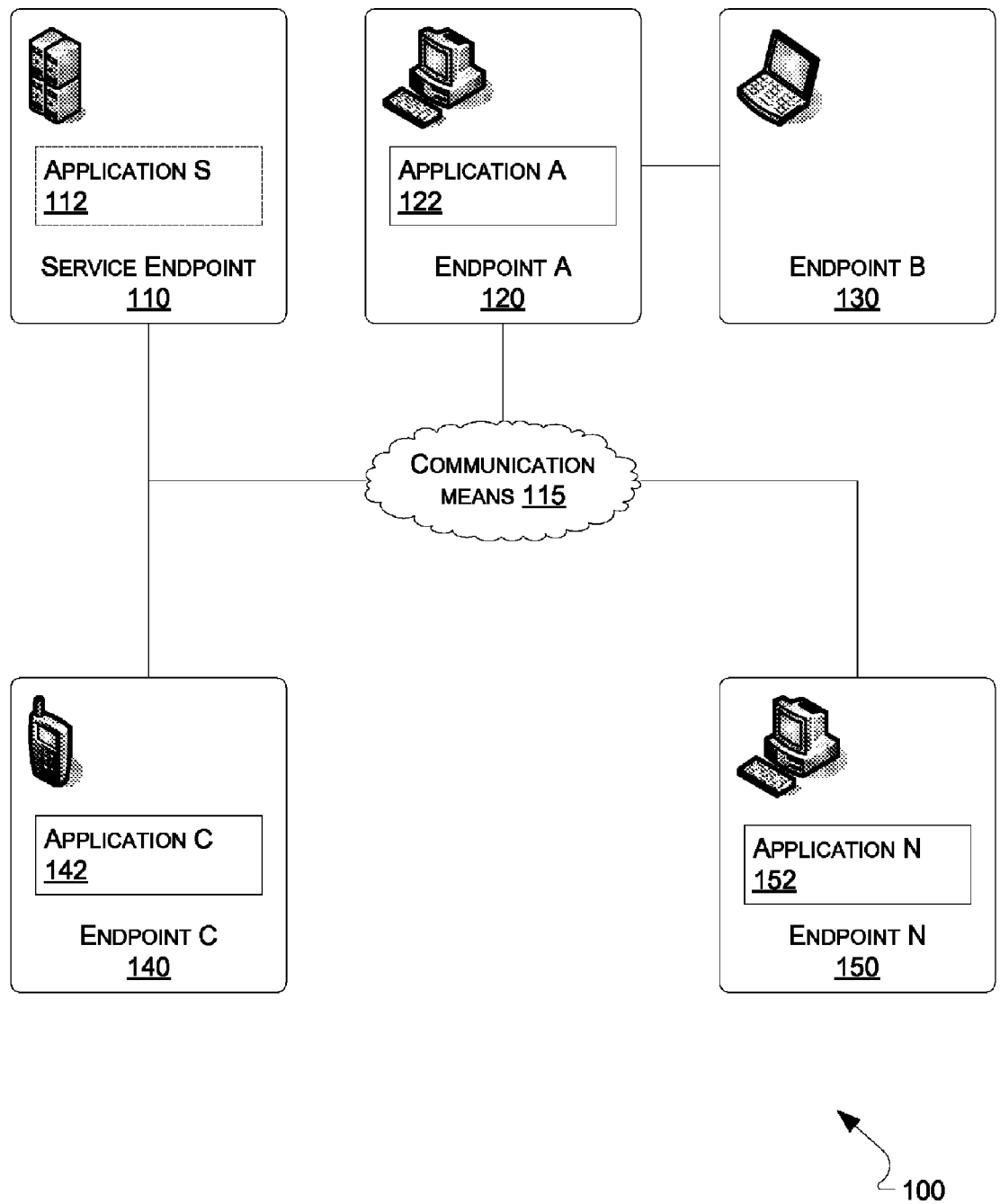
FIG. 1 illustrates an exemplary system in which sharing and synchronization that uses services provided by an endpoint might be implemented.

The present invention extends to various techniques and technologies directed toward sharing and synchronizing data using, in at least some implementations, the addition of synchronization data to a feed that contains data items, and at least one node or endpoint that provides synchronization-related services to other endpoints. More particularly, described herein are, among other things, methods, systems, and data structures that facilitate the synchronization of information through the use of at least one endpoint—perhaps called a "service endpoint"—that provides one or more synchronization services to a variety of endpoints. The service endpoint and the client endpoints that use the service endpoint may use synchronization data that is part of feeds of data to share information, to incorporate changes in a consistent manner, and to resolve conflicts.

In general, in some implementations, synchronization of data may be implemented, at least in part, by the addition of particular data to a feed of data provided using a possibly widely accepted protocol like RSS ("Really Simple Syndication" or "Rich Site Summary"). For example, in an exemplary implementation with a topology that consists of only two endpoints that communicate with each other, one endpoint might publish an RSS feed that contains some type or types of information. In perhaps one example, the feed might include calendar item information represented using a format like iCalendar or hCalendar, or some other format. The other endpoint might subscribe to the feed provided by the first endpoint and be notified when, for example, the first endpoint adds a new calendar item or changes an existing calendar item. In addition, a subscribing endpoint might publish its own feed, with the same data as is provided in the original publisher's feed and also with changes or additions made by the subscriber. The original publisher might then subscribe to this second feed. Through these mutual subscriptions, changes made by either endpoint may be reflected in the data maintained by both endpoints, enabling bidirectional synchronization. Multiple endpoints may participate and share the data by subscribing to at least one of the feeds provided by another endpoint and similarly publishing their own feed.

While endpoints may synchronize with each other in a direct fashion—such as in the example described previously—in some cases it may be beneficial to use one or more endpoints that provide additional services that may be useful when synchronizing data. For example, one or more endpoints that synchronize data might only be connected intermittently, might sometimes not have a public network address (perhaps when the endpoint is located behind a firewall, for example), or might be otherwise unable to provide a feed of data. In such a case, and in other cases, it may be beneficial to have at least one endpoint that is "always on" or that at least is available more often than endpoints with, for example, intermittent network connectivity. A more available endpoint might be, for example, located in a data center with redundant infrastructure. In practice, one endpoint might synchronize data with the available endpoint and then become unavailable, after which another endpoint may come online. Without the available endpoint, the second endpoint might not be able to receive changes made by the first endpoint. However, since the available endpoint exists, the second endpoint may synchronize with the available endpoint and thereby obtain changes made by the first endpoint.

In another example, one or more endpoints may not want to or be able to implement all of the functionality required to, for example, merge changes made by other endpoints. This may be the case, for example, when a client endpoint does not have the computing or development resources to easily implement such functionality, or for other reasons. In at least these or some other cases, at least some of the implementation and operation required for synchronization may be "off-loaded" or performed by another synchronization endpoint. The client endpoints that use this other synchronization endpoint might, for example, submit requests and then retrieve or receive responses, rather than have to implement particular synchronization functionality themselves.

In other examples, an endpoint might provide other additional functionality that might be useful when synchronizing data including, for example and without limitation, access control, authorization by particular identifying values or roles, centralized management and publishing of multiple feeds, and so on.

Turning now to FIG. 1, illustrated therein is an exemplary system 100 in which sharing and synchronization that uses services provided by an endpoint might be implemented. The exemplary system 100 contains the service endpoint 110. The exemplary system also contains endpoint A 120, endpoint B 130, endpoint C 140, and endpoint N 150. Each of the endpoints in this example might represent one or more general-purpose or dedicated computer systems, including server computers, desktop computers, laptop computers, workstation computers, mobile or cellular telephones, personal digital assistants (PDAs), and the like. In this example, at least some endpoints are shown as being associated with an application, such as application S 112, application A 122, application C 142, and application N 152. Some of the illustrated endpoints are shown as connected using some exemplary communication means 115, while other endpoints are shown connected to each other directly. Finally, this description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally speaking, a sharing relationship may exist between two endpoints. For example, a sharing relationship might exist between the service endpoint 110 and endpoint A 120, between endpoint A 120 and endpoint B 130, and so on. A particular sharing relationship generally relates to a set of data that is synchronized or shared and that comprises one or more data items, or simply "items."

An endpoint in a sharing relationship may be a publisher, a subscriber, or both a publisher and a subscriber. A publisher may generally make available a "feed" that contains information associated with the items being shared as part of the sharing relationship. A subscriber may be an endpoint that subscribes to a feed provided by a publisher. In the case where both endpoints in a sharing relationship are publishers and subscribers, each endpoint may make available a feed to which the other endpoint subscribes. Additionally, and as will be explained in more detail below, in some cases an endpoint may rely on another endpoint, including relying on the service endpoint 110, to perform various synchronization operations on its behalf, including merging changes and making changes available to other endpoints by publishing a feed.

In general, in at least some exemplary implementations an endpoint may make "local" changes to items, where a "local" change may be a change made on the particular endpoint for some reason, including changes made by users, by automated processes, and so on. Then, so the items being shared may be kept the same on subscribing endpoints, the local change may be published as part of a feed. Other endpoints that subscribe to the feed may "merge" the changes exposed using the feed with their own local store of items. Other endpoints may also make local changes of their own, which may then be merged or incorporated by other endpoints. In at least some implementations, including those that use "Simple Sharing Extensions" (SSE), a local change might be made with operations similar to or the same as those described below, for example, with reference to FIG. 7. In the same or other implementations, merging may be accomplished using operations similar to or the same as, for example, those described with reference to FIG. 8.

In some cases, an endpoint may make a local change to an item and then provide an updated feed, or the change, to another endpoint. The other endpoint may perform, for example, a merge operation on behalf of the endpoint and ultimately produce an updated feed that includes the local change. The other endpoint may then make the feed available to the endpoint that made the change or to other endpoints. In such an implementation, the endpoint that makes the local change may not need to, for example, know how to merge changes from yet other endpoints. Instead, it may, for example, only need to understand how to incorporate its own local changes, and may rely on another endpoint—which may be the service endpoint 110 in at least some implementations—to merge its changes with changes made by other endpoints.

In some cases, the data synchronized between endpoints may be data used by one or more applications—including application S 112, application A 122, application C 142, and application N 152—that operate on or are associated in some fashion with the endpoints. An endpoint may have zero or more of such applications, including any number of applications.

In some cases, an application may be configured or implemented with at least some knowledge of how synchronization operates, and so may, for example, store or update information directly in one or more feeds. In other implementations, an application may have a limited knowledge of how data is synchronized, or in some cases even that data is synchronized at all. In at least some of these implementations, one or more intermediary layers, assisting executable code, or the like, may modify or otherwise translate information stored and used by an application into a format suitable for publishing or subscription using a feed. For example, suppose that application A 122 in some implementations comprises a personal information management (PIM) application that enables a user to maintain information that includes contact data. If the user shares or synchronizes some or all of their contact data, there may be executable code, for example, that produces or generates a feed that contains, among other things, the contact data the user is sharing or synchronizing. As just one example, the feed might represent the contact data using the hCard standard, the vCard standard, or any other format for representing contact data. When a user changes a particular contact using application A, at some point an updated feed may be generated that contains the change.

While the previous example relates to a feed that might contain data represented using a format like hCard or vCard, a feed may contain any type of data, including XML, XHTML, other text formats, binary data in one or more of a variety of formats, and so on. In some cases, the format or formats used to represent the data may be "recognized," "known," or able to be interpreted by, for example, an endpoint that has a sharing relationship or that provides service functionality. In other cases at least some of the data communicated in a feed may be in a format that may not be recognized by one or more endpoints, services, applications, or the like. In the latter case, the endpoint, service, application, or the like, may in all or at least some cases still synchronize and share the information by, for example, reproducing the data that has the unrecognized format while processing the associated synchronization information according to any requirements of the synchronization protocol or technique in use.

The feed may itself contain shared or synchronized data, may contain data as well as references to data stored elsewhere, may contain only references to data stored elsewhere, and so on. In at least one example, where the feed is represented using a protocol like RSS, an element such as an "enclosure" element may be used to reference data that may not be contained by the feed itself.

It should be noted that an endpoint may still synchronize data even if it is not associated with an application that may change or even use or display that data in some form—for example, endpoint B 130 might not change data, but might still synchronize the data. Similarly, the service endpoint 110 might in some cases have an application S 112 that uses the data outside of synchronization, but may, for example, in other cases only synchronize or perform synchronization operations for other endpoints. Furthermore, as was previously stated, while only a single application is shown for any particular endpoint, any number of applications may be associated with or implemented on a particular endpoint.

It is noted that not all endpoints must both publish a feed and subscribe to a corresponding feed. For example, some endpoints may only publish, but not subscribe, to a feed related to some particular set of data. Such endpoints may publish information about local changes made by that endpoint, but may not incorporate changes made by any other endpoint. Any other arrangement of publishing and subscribing actions may be contemplated or implemented depending on the requirements of the particular scenario or situation.

Note that, in some implementations, a particular set of two endpoints might have more than one sharing relationship if they share more than one set of data. In other implementations, a sharing relationship might be defined to include all of the data shared between two endpoints, even if it includes more than a single set or type of data.

In general, in some exemplary implementations, any of the endpoints illustrated in the exemplary system 100 might be an endpoint that participates in a sharing relationship with another endpoint. The particular type or purpose of an endpoint may not be relevant, as long as the endpoint can follow the necessary processes for sharing and synchronizing data, or rely on another endpoint to implement at least some of the processes for sharing and synchronizing data, as are described herein. Similarly, the manner in which an endpoint is connected to another endpoint may not generally be relevant, as long as both endpoints have some mechanism by which they can access feeds of data or publish feeds of data. Such mechanisms might consist of a network connection between two endpoints as might be illustrated, for example, by the connection between, among other endpoints, the service endpoint 110 and endpoint A 120, which are connected using the exemplary communication means 115. Generally, endpoints may be connected by any means by which data may be transmitted, including any type of network or any other kind of transfer mechanism, including the transfer of physical media, like a compact disc (CD) or flash memory drive. Such a connection might be illustrated by, for example, the connection between endpoint A 120 and endpoint B 130, or might be illustrated by the connection between, say, the service endpoint 110 and endpoint A 120, in the case where the exemplary communication means 115 includes the manual transfer of feeds of data.

While in some implementations sharing relationships exist between two endpoints, it is also possible for a particular set of items to be shared and synchronized with any number of endpoints. This may be accomplished through a variety of arrangements or topologies of endpoints. For example, suppose in the exemplary system 100 that all endpoints share and synchronize the same set of items. One arrangement in which this might be implemented might be one in which all of the endpoints synchronize items with the service endpoint 110. For example, endpoint A 120 might have a sharing relationship with the service endpoint for the set of items; endpoint B 130 might have a sharing relationship with the service endpoint for the same set of items, and so on, to endpoint N 150. In another arrangement, endpoint B might have a sharing relationship for a particular set of items with endpoint A. Endpoint A might then have a sharing relationship for the same set of items with the service endpoint. While in this latter example endpoint B does not have a direct sharing relationship with the service endpoint, changes made by endpoint B may still be synchronized with the service endpoint, as long as, for example, endpoint A has a sharing relationship for the same set of items with the service endpoint.

An endpoint may subscribe to and publish a variety of feeds, and the feeds may be represented using different formats, as introduced previously. Furthermore, items obtained from a feed that is represented using a particular format need not be published or further distributed using a feed or feeds that use that same format—items may be published in any format supported or understood by the publisher. For example, an endpoint might subscribe to one feed that uses RSS and another feed that uses Atom. That same endpoint may then publish the same set of data, or any other set of data, using RSS, Atom, or any other type of feed format, independent of how the data was originally obtained or represented.

Finally, while the service endpoint 110 includes the term "service" in its name, it should be noted that in at least some implementations a variety of the endpoints shown may perform "service" operations on behalf of other endpoints or provide services to other endpoints. Furthermore, in some implementations more than one service endpoint may be available at a time and may be used by one or more client endpoints, as well as with one or more additional service endpoints (so that multiple service endpoints might have sharing relationships with each other, for example).

Figure 2:
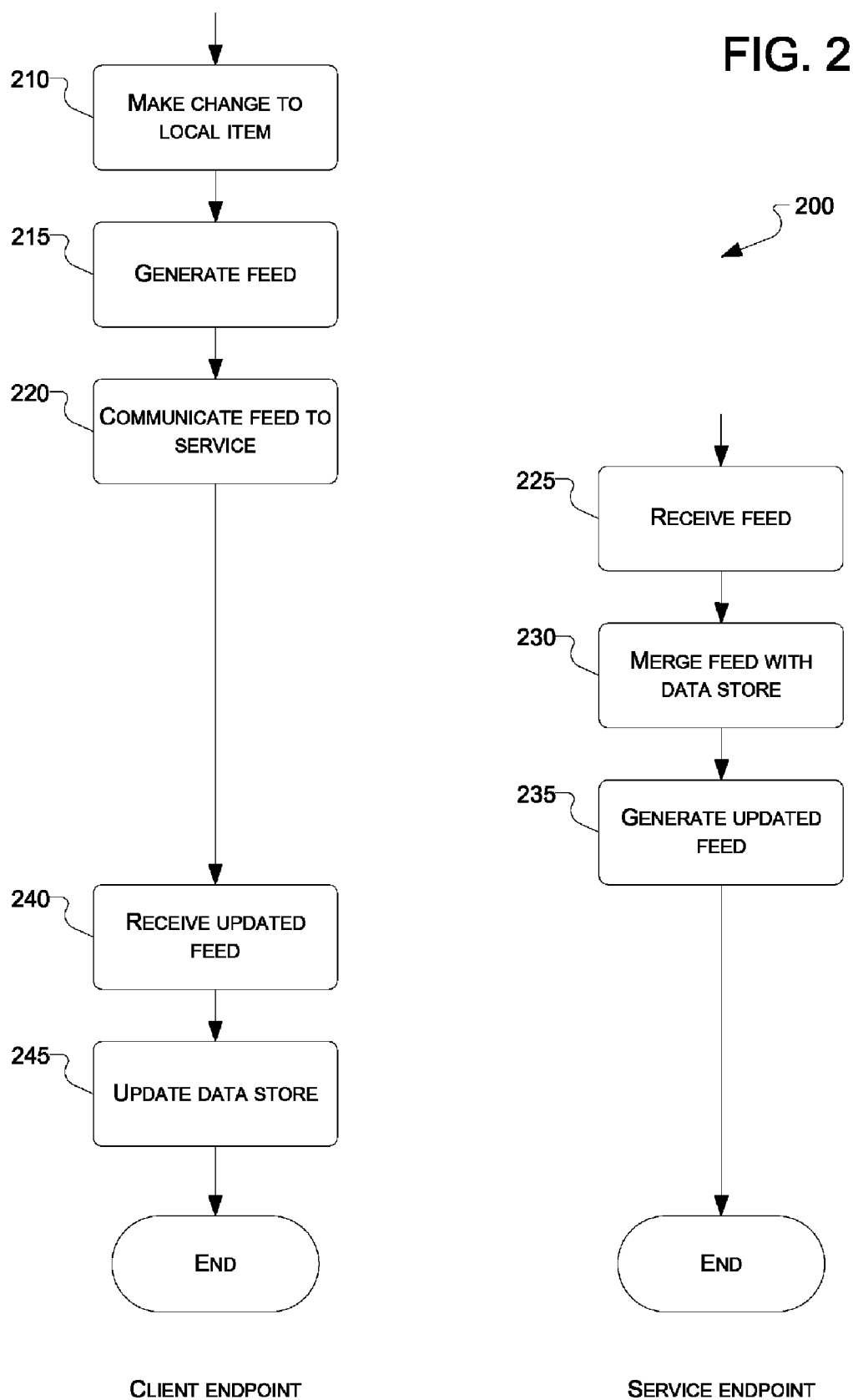
FIG. 2 illustrates an exemplary generalized operational flow including various operations—including merging data and storing data—that may be performed when using services provided by a service endpoint.

Turning now to FIG. 2, shown therein is an exemplary generalized operational flow 200 including various operations—including merging data and storing data—that may be performed when using services provided by a service endpoint. Operations that might be performed on an endpoint that uses services are shown in the "client endpoint" column, while operations that might be performed by a service endpoint are shown in the "service endpoint" column. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

As was introduced previously, and as is described in more detail below, for example with reference to FIG. 5 and subsequent figures, endpoints may in some cases synchronize data without the use of services provided by other endpoints. For example, in some implementations each endpoint in a two-way bi-directional synchronization relationship may make local changes to data that is synchronized. In some implementations, such local changes may be made, for example, using operations that are the same as or similar to those described below with reference to, for example, FIG. 7. When an endpoint makes a local change, the endpoint may update one or more feeds of data. The other endpoint may at some point retrieve, receive, or otherwise access the updated feed provided by the first endpoint and may merge the changes in the updated feed with its own local data. Merging may be performed, in at least some implementations, using at least some operations that are the same as or similar to those described below, for example, with reference to FIG. 8, FIG. 9, FIG. 10, and FIG. 11.

In some implementations and cases, however, an endpoint that makes a local change may use one or more services that in some cases might be provided by some other endpoint to perform at least some sharing or synchronization tasks. Some services and some manners in which such services may be accessed are described in more detail herein, especially with reference to FIG. 2, FIG. 3, and FIG. 4.

Returning to FIG. 2, in an exemplary implementation of operation 210, an endpoint may make a change to a local item in a data store accessible to the endpoint. This local change may in some cases include the addition of an entirely new item, or the deletion of an existing item, in addition to the modification of information for an existing item. As just one of many possible examples, where the stored and synchronized data includes, say, contact information, a user might use a PIM application to add a new contact, delete a contact, or modify a contact.

The endpoint that makes the local change in this operation may in some cases, including in this operational flow, be referred to as a "client endpoint," because the endpoint may be a client of services provided by some other endpoint, which may be referred to as a "service endpoint." However, the usage of these terms is done for the purposes of temporal identification only, and any endpoint may in general be a client of services provided by another endpoint. In some implementations, the same endpoint may be a "client endpoint" in that it accesses services provided by another endpoint, and a "service endpoint" in that it provides services to another endpoint, at the same time.

In an exemplary implementation of operation 215, a feed may be generated. In some cases, this generated feed may include the change made in operation 210. Continuing with the same example, in some implementations the feed may contain multiple elements or items, including perhaps one item or element for each contact that is shared or synchronized. In other implementations, the feed might only contain an item or particular element or elements for changes; items that have not been changed may not be part of the feed. As has been introduced previously and as discussed in more detail below, for example, with reference to FIG. 5, such a feed may be represented in a wide variety of formats, may include a wide variety of data, and so on. The local change may be represented in the feed using operations including those, for example, that are described below for execution when updating a local item, as in FIG. 7.

At this point, in at least some implementations, including at least some where individual endpoints make their feed accessible and perhaps perform their own merging of data from feeds they retrieve from other endpoints, the operational flow might end. That is, as the local change made in operation 210 is now published as part of a feed, other endpoints may access the published feed and merge any changes with their own associated data stores.

However, in some implementations, the endpoint that made the change may use one or more services provided by another endpoint. In an exemplary implementation of operation 220, the client endpoint may communicate a feed, including the feed generated in operation 215, to a service endpoint. The communicated feed might contain all items, or might contain some subset of items that are part of the sharing relationship, including only items that have been changed. Such communication may be accomplished in one or more of a variety of ways. As just one example, the client endpoint might initiate an HTTP POST request to a particular URL that might be associated with the service endpoint and might also be, for example, associated with the feed in question. The contents of the POST request might include the feed generated in operation 215. In other implementations, the generated feed may be communicated to the service endpoint in other ways, including through the use of other types of communications initiated by the client endpoint or communications initiated by the service endpoint or some other endpoint.

In at least one exemplary implementation of operation 225, the feed may be received by the service endpoint. For example, the service endpoint might receive an HTTP POST request initiated by the client endpoint, or might receive the feed in some other fashion. In some implementations, the received feed may be stored on the service endpoint and might be made available to, for example, other endpoints. For example, other endpoints may be able to send an HTTP GET request to the same URL to which the feed was posted and receive a copy of the feed in the response to their request. In the same or other implementations, the feed may undergo further processing on or associated with the service endpoint itself.

For example, in at least one implementation of operation 230, the service endpoint may merge a received feed—including in some cases the feed received from the client endpoint in operation 225—with one or more existing feeds or items in data stores. For example, suppose that the service endpoint maintains the set of items represented by the feed in a data store. In an example where the feed contains contact information, the service endpoint might maintain the contacts. It may do so in a variety of fashions, including as records in one or more databases, as a copy of the feed, and so on.

When a feed is received from another endpoint, the service endpoint may merge the contents of the feed or the changes communicated by the feed with the data it maintains in a data store. In at least some implementations, including those that use SSE, this merge operation may be performed using at least some operations that are the same as or similar to those described below, for example, with reference to FIG. 8, FIG. 9, FIG. 10, and FIG. 11. In the context of these other figures, and in at least some implementations, the feed received in operation 225 may be considered to be the "foreign feed." Merging may involve, for example, examining the items in the incoming or foreign feed and performing a variety of operations on the service endpoint depending on the information in the feed and the service endpoint's data store or data stores. For example, when the feed includes an item that does not exist in a data store associated with the service endpoint, the service endpoint may create a new local item; when the feed includes changes to an item that already exists in a service endpoint data store, the service endpoint may examine how or if the local item should be updated (including perhaps identifying conflicts); and so on.

In some implementations, the execution of operation 230, as well as other operations, may vary so that, for example, the operation is executed differently depending on characteristics such as which client endpoint has communicated a feed. For example, a service endpoint might determine that merging the contents of a feed with its own data would cause one or more conflicts. This might be the case when, for example, some other client endpoint has previously made a change to the data maintained by the service endpoint, and the client endpoint that has communicated the feed being merged does not know of the change. In some implementations, and with some or particular client endpoints, a service endpoint might perform the merge and note the conflict. It might do so using exemplary conflict handling logic like that described below with reference to FIG. 8, FIG. 9, FIG. 10, and FIG. 11. In other implementations, or in the same implementation, and with other particular endpoints, the service might not merge the data communicated by the client endpoint if the merge operation would cause a conflict. Instead, the service endpoint might perform some other action including, for example, notifying the client endpoint that merging the update would cause a conflict. (In some cases, then, the client endpoint might attempt to avoid a conflict by retrieving an updated feed from the service endpoint and then changing and submitting the updated feed.) In some implementations, both behaviors may be implemented by the same service endpoint so that, for example, some client endpoints are "allowed" to submit changes that cause conflicts while other client endpoints are not.

In an exemplary implementation of operation 235, the service endpoint may generate an updated feed that includes any changes made or identified, for example, when merging the received feed with the service endpoint's data. This updated feed may be generated in the same or similar fashion as the feed is generated, for example, in operation 215, or in some other fashion. For example, in some cases the feed may contain all of the items that are part of the sharing relationship, in other cases the feed may only contain items that were changed as part of the execution of operation 230, and so on. The feed may then be made accessible to other endpoints in a variety of ways.

Returning to operations that may be performed on or associated with a client endpoint, in an exemplary implementation of operation 240, the client endpoint may receive, retrieve, or otherwise access an updated feed generated by the service endpoint. In some cases this updated feed may be the same feed that was previously generated in operation 235. For example, in some implementations, the client endpoint may initiate an HTTP GET request—perhaps to the same URL that may accept an HTTP POST request with the client endpoint's feed, or to some other URL—and receive the updated feed in the response from the service endpoint. In some implementations, the client endpoint may provide additional information in a request including data such as a time associated in some fashion with the last time the client endpoint received the feed from the service endpoint. The service endpoint might then, for example, only return changes that were made since the previous communication. In other implementations, the client endpoint may receive or access the updated feed in some other fashion, including implementations where the service may "call back" the client in some form, and so on.

Finally, in at least one exemplary implementation of operation 245, the client endpoint may update its local data store in some fashion, including through the use of the received and updated feed. For example, some client endpoints may actually store or maintain application data in a feed itself. In these cases, the client endpoint may simply store the retrieved feed. In other implementations, the client endpoint may perform a wide variety of general or possibly application-specific processing to integrate the information in the updated feed into one or more of the client endpoint's data stores.

It should be noted that while the operational flow described with reference to FIG. 2 is explained in terms of two endpoints, in at least some implementations multiple client endpoints may, for example, interact with the same service endpoint. In some cases multiple client endpoints may be able to, for example, exchange data between themselves by using the service endpoint as an intermediary. For example, suppose that client endpoint A makes a local change and communicates the resulting feed to the service endpoint, which then first merges the changes from client endpoint A into a data store associated with the service endpoint, and then makes an updated feed accessible to other endpoints. Client endpoint B might then retrieve the updated feed, at which point client endpoint B would have access to the changes initially made by client endpoint A. In some cases, client endpoint B might then make its own changes and provide a feed to the service endpoint. After the service endpoint merges the changes from client endpoint B, client endpoint A could similarly receive client endpoint B's changes by retrieving the updated feed from the service endpoint.

While at least some of the operations described with reference to FIG. 2 refer to making changes by generating and communicating feeds to a service endpoint, in at least some implementations changes and other actions may be communicated to or performed by a service endpoint in one or more other fashions that may or may not use or require the communication of a feed. For example, rather than making a change locally, generating an updated feed, and communicating the updated feed to a service endpoint using a protocol like HTTP, a client endpoint might instead interact with the service endpoint and just, for example, communicate a change to be made to an item maintained by the service endpoint. The client endpoint, in just one example, might communicate such a request or change using something like a web service or other "programmatic" interface, or might interact with the service endpoint in any of a variety of other manners.

While merge operations are performed by a service endpoint in the operational flow previously discussed, there may be implementations that operate differently. For example, in some implementations, one or more client endpoints might perform merges locally and use the service endpoint for other services, including perhaps as a data store that is accessible to other endpoints. In at least some of such implementations, a client endpoint might maintain items locally, retrieve a feed from the service endpoint, and then—locally, on the client endpoint—merge any changes in the retrieved feed into its own data store. The client endpoint may then in some cases generate an updated feed and communicate the updated and generated feed to the service endpoint, where the updated feed might be stored and made accessible to other endpoints. In some implementations, some client endpoints may perform merge operations locally while other client endpoints may rely on a service endpoint to merge changes. In some cases this may be possible even when the client endpoints share and synchronize the same data using the same feed.

Figure 3:
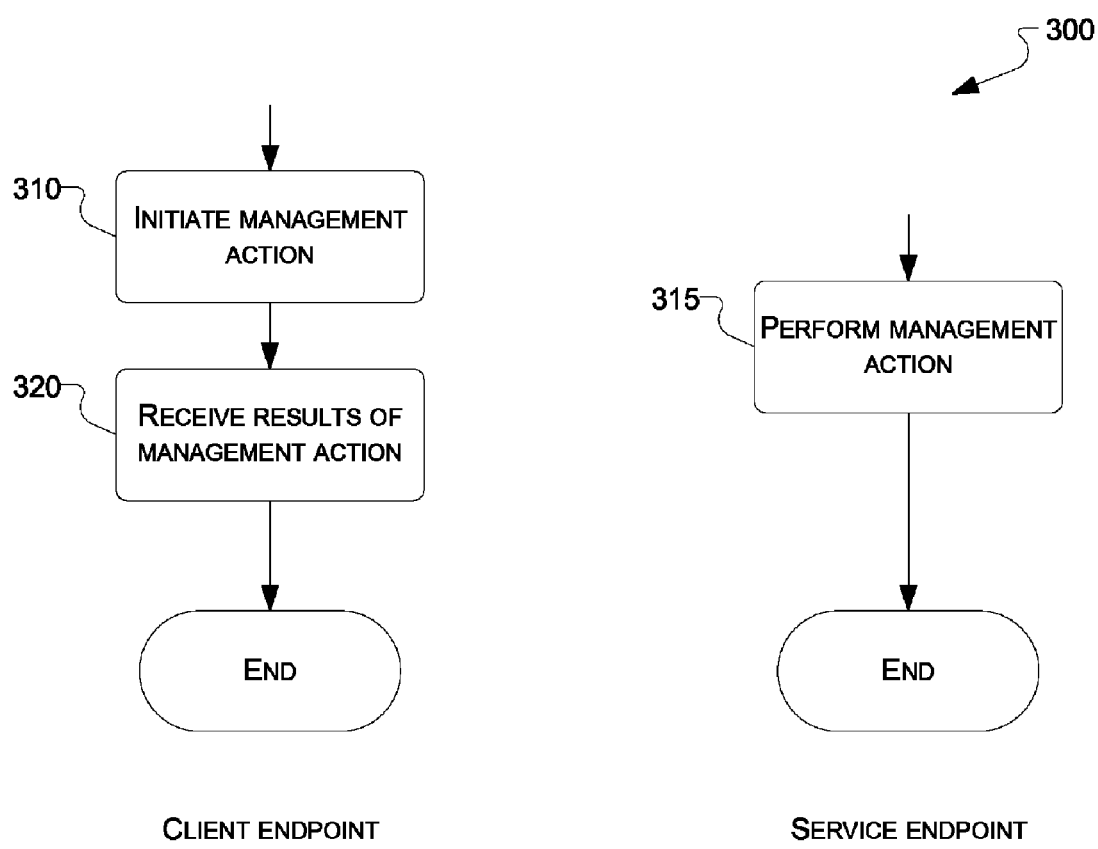
FIG. 3 illustrates an exemplary generalized operational flow including additional various actions—including general management and feed management actions—that may be performed when using services provided by a service or other endpoint.

Turning now to FIG. 3, shown therein is an exemplary generalized operational flow 300 including additional various actions—including general management and feed management actions—that may be performed when using services provided by a service or other endpoint. Operations that might be performed on an endpoint that uses services are shown in the "client endpoint" column, while operations that might be performed by a service endpoint are shown in the "service endpoint" column. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In general, it may be beneficial in at least some exemplary implementations to enable the management of data—including in some cases one or more feeds—that is in turn provided and managed by a service endpoint. For example, given a service endpoint that may provide multiple feeds, it may be desirable to provide functionality that enables an endpoint or other entity to manage the feeds accessible through the service endpoint.

In an exemplary implementation of operation 310, a client endpoint may initiate a management action. A wide variety of management actions are possible. For example, and without limitation, possible management actions include listing all feeds, retrieving detailed information about one or more feeds, creating a new feed, deleting a feed, and so on. As just one example, a client endpoint might use a "create new feed" action to indicate that the service endpoint should store and manage a new feed of data. Associated with the "create new feed" action, the client endpoint might provide additional information including, for example and without limitation: a name for the feed, a description of the feed, and so on. In some implementations, the client endpoint may also provide an initial feed document. (In other implementations, the same or some other client endpoint may provide an initial feed document at some other time or in some other fashion including, for example, in a similar fashion to that described previously with reference to the communicate feed to service operation 220 of FIG. 2.)

A client endpoint may initiate a management action in a variety of ways. For example, in some implementations the client endpoint may submit one or more of a variety of HTTP requests using URLs that may be defined by the service endpoint. In other implementations, the client endpoint may use any of a variety of other communication mechanisms to initiate a management action. The manner in which any results or feedback about the requested action are communicated to the client endpoint—as is explained below with reference to operation 320—may also change depending upon the communication mechanisms used to initiate the action. For example, when the action is initiated using an HTTP request, and at least with certain actions—including those that may be completed relatively quickly—results or feedback may be provided in the HTTP response to the HTTP request.

In an exemplary implementation of operation 315, the service endpoint may perform the management action that was initiated in operation 310. The manner in which this operation is performed may vary widely depending on, for example, the requested action, the manner in which feeds and other data are maintained or stored by the service endpoint, and so on. For example, a service endpoint might create a new feed by updating a data store—implemented in one or more databases, for example—with data including information provided by the client endpoint, like a name and description, as well as with information identified on the service endpoint, like a location or URL at which the feed is accessible, and so on.

Finally, in at least some exemplary implementations of operation 320, and with at least some management actions, results or feedback associated with the requested management action may be communicated to the client endpoint. For example, when a new feed has been created, a location or URL at which the feed is accessible may be communicated as part of a response. (The client endpoint might then use the URL by posting an initial feed document, as has been mentioned previously.) In the same or other implementations, other information, including success or failure information, may be communicated. For example, if a client endpoint has requested a listing of feeds, that listing might be received as part of this operation, and so on.

It should be noted that although the discussion has referred to a client endpoint initiating management actions that in some cases some other endpoint—including the service endpoint itself—may initiate such management actions.

Figure 4:
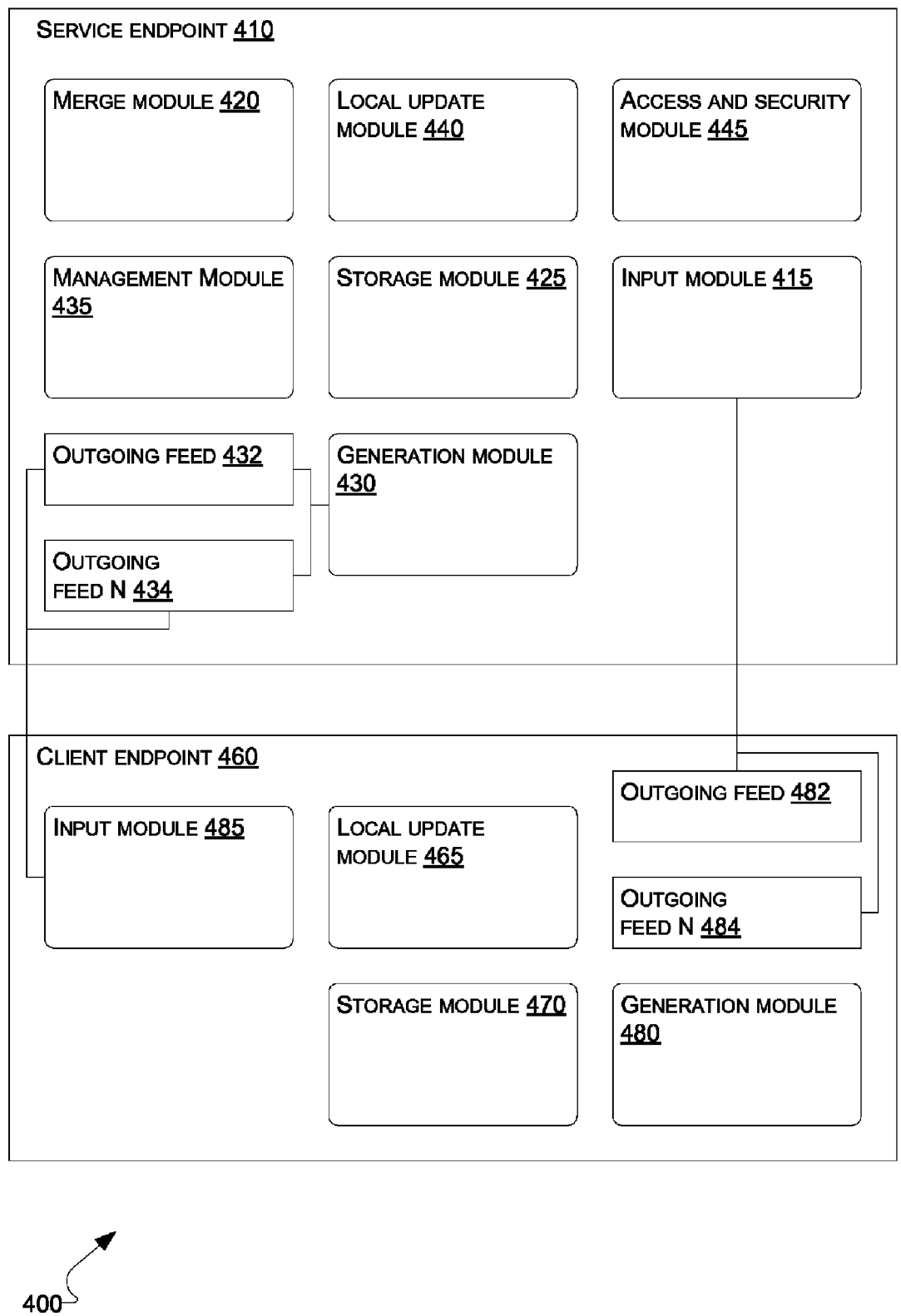
FIG. 4 illustrates an exemplary system in which an endpoint might provide services to other endpoints.

Turning now to FIG. 4, shown therein is an exemplary system 400 in which an endpoint might provide services to other endpoints. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist. Furthermore, while the exemplary diagram shows elements as being part of or contained by a particular computer system, for example, it should be noted that one or more modules associated with a particular endpoint may also be implemented by one or more other computer systems and connected to the exemplary illustrated computer systems by any means sufficient for exchanging any necessary data.

The exemplary system 400 may contain a service endpoint 410, an input module 415, a merge module 420, a storage module 425, a generation module 430, a management module 435, a local update module 440, and an access and security module 445. Also illustrated as associated with the service endpoint are an outgoing feed 432 and an outgoing feed N 434. The exemplary system may also contain a client endpoint 460, a local update module 465, a storage module 470, a generation module 480, and an input module 485. Also illustrated with the client endpoint are an outgoing feed 482 and an outgoing feed N 484.

In general, in at least some exemplary implementations, the client endpoint 460 may share and synchronize data using one or more services provided by the service endpoint 410. For example, and generally in some implementations, the client endpoint 460 may perform at least some of the operations described previously with reference to the "client endpoint" columns in FIG. 2 and FIG. 3. Similarly, and also for example, the service endpoint 410 may in some cases perform at least some of the operations described previously with reference to the "service endpoint" columns in FIG. 2 and FIG. 3.

The exemplary service endpoint 410 and client endpoint 460 may contain multiple modules, including some or all of the illustrated modules, as part of an implementation that enables the sharing and synchronization of data. In some implementations, each of the service endpoint and client endpoint might be implemented by a computing environment including the exemplary computing environment discussed below with reference to FIG. 12.

In some implementations, the exemplary service endpoint 410 may contain an input module, such as the exemplary input module 415. Such an input module may perform a variety of tasks associated with the input of data, including accepting feeds submitted by other endpoints, accepting programmatic or web service requests or calls from other endpoints, and so on. For example, in some implementations, the input module 415 may receive a feed in a manner similar to or the same as was described previously with reference to operation 225 of FIG. 2. As shown, the input module may accept one or both of the client endpoint's outgoing feed 482 and outgoing feed N 484. The input module may perform a variety of tasks using an accepted feed or request, including storing the feed or change, making the feed available to other modules or endpoints, and so on. An accepted feed might be implemented in a variety of ways and using a variety of formats, as has been previously introduced and discussed, and as is discussed in more detail below, for example, with reference to FIG. 5. For example, in one implementation, an accepted feed might comprise an RSS feed, and each "item" element in the RSS feed might contain information about a data item that is part of a sharing relationship.

In the same or other implementations, the exemplary service endpoint 410 may contain a merge module, like the exemplary merge module 420. Among other tasks, such a merge module might use one or more feeds of data or requests from client endpoints, including feeds or requests accepted by the input module 415, such as the outgoing feed 482, and might incorporate the items and changes expressed by the feed or request into the local store maintained by the service endpoint 410. Such a local store of items might be implemented in some embodiments by the exemplary storage module 425. The exemplary storage module 425 might be implemented in a variety of ways, including through the use of local or remote databases, flat files, and any other means by which data might be stored.

In some implementations, the exemplary merge module might implement the merging of data from an accepted feed or request as was described, for example, with reference to operation 230 of FIG. 2. The detailed merge operations may in turn include some or all of the operations described below with reference to FIG. 7, among other figures and examples. In examples where an accepted feed comprises an RSS feed and each "item" element in the RSS feed contains information about a data item, the merge module might iterate through all of the "item" elements in the RSS feed document and merge any changes into the store of items maintained by the storage module 425.

In the same or other implementations, the exemplary service endpoint 410 may contain a generation module, like the exemplary generation module 430. Such a generation module might, among other tasks, generate one or more outgoing feeds—perhaps represented by the exemplary outgoing feed 432 and the exemplary outgoing feed N 434—that contain some or all of the items stored by, for example, the storage module 425. In the same or other examples, a generation module might produce a reply to a request received from a client endpoint, or initiate a request to a client endpoint in response to a request from the client endpoint. In doing so, the generation module may implement all or part of the exemplary operation 235 described previously with reference to FIG. 2. A generation module might generate such a feed or outgoing request or reply in a variety of ways depending upon, among other things, the mechanisms by which the items are stored and the specific format and contents of the outgoing feed. For example, in one implementation, a generation module might retrieve particular database rows from a database that is part of an embodiment of storage module 425 and then generate an outgoing feed document, perhaps using RSS, that contains "item" elements for the data items that are part of the sharing relationship.

Not all of the data items maintained by the storage module 425 need be used by the generation module 430 or be part of any particular outgoing feed; only those data items that are part of a sharing relationship may be used to form the outgoing feed. Furthermore, multiple outgoing feeds may in some cases represent a different set of data items and comprise different elements than the feed or feeds that have been accepted by the input module 415. The ability to control the contents of the outgoing feeds produced by the generation module 430 may be useful to, for example, partition data by providing different feeds containing different items. Different endpoints may then access different feeds. As just one example, the service endpoint might make an outgoing feed that contains a subset of data items available to one set of endpoints and make a different outgoing feed that contains a different subset of items available to a different set of endpoints.

Another module that might exist in the exemplary service endpoint 410 may be a management module, such as the exemplary management module 435. A management module may provide a variety of different kinds of management functionality to endpoints. In some implementations, such management functionality may include some or all of the management tasks and operations described previously with reference to FIG. 3, including listing all feeds, retrieving detailed information about one or more feeds, creating a new feed, deleting a feed, and so on. In the same or other implementations, a management module may provide additional or different management functionality.

In at least some implementations, the exemplary service endpoint 410 may contain a local update module, like the exemplary local update module 440. Such a local update module might be capable of performing local updates of data items maintained by the service endpoint 410, including those stored by the storage module 425. In this context, the term "local update" might refer to the change of a data item outside of merge operations that incorporate changes made by other endpoints, including the merge operations that might be performed by an exemplary merge module 420. For example, in just one example, a local update module might update data items when a user edits items or adds new items on the service endpoint itself, by interacting with the service endpoint directly or indirectly without submitting a feed and having the feed merged by the service endpoint.

Another module that might exist in the exemplary service endpoint 410 may be an access and security module, such as the exemplary access and security module 445. An access and security module may implement access and security functionality associated with other services or functionality provided by the service endpoint. For example, an access and security module may maintain or be able to identify—perhaps through the use of another service that may be external to the service endpoint—a set of users, groups, endpoints, or other entities, as well as associated permissions or authorizations for such users, groups, endpoints, or other entities. Using this information, the access and security module may be able to, for example, only allow particular users or endpoints to submit feeds, only allow particular users or endpoints to retrieve particular feeds, allow particular users or endpoints to submit and retrieve certain feeds but not to access other feeds, and so on.

An access and security module may use a variety of other services and functionality to, for example, control access to feeds, control access to service endpoint functionality, and so on. Such other services and functionality might include, for example, an external identity provider, such as the "Live ID" or "Passport" service provided by Microsoft Corporation of Redmond, Wash., or may include other services.

Continuing and as was introduced previously, in some implementations, the client endpoint 460 may perform at least some of the operations described previously with reference to the "client endpoint" columns in FIG. 2 and FIG. 3.

On the client endpoint 460, using a local update module 465 that may in some cases be similar to the local update module 440, the client endpoint may make a change to an item maintained by or associated with the client endpoint. Such a change may involve, in at least some implementations, modifying data stored or accessed using the storage module 470. Such an operation may implement all or part of the exemplary operation 210 described previously with reference to FIG. 2. Subsequently, a generation module 480 may produce one or more feeds that may incorporate the local change, may be represented by the outgoing feed 482 and the outgoing feed N 484, and may be communicated to a service endpoint. In so doing, the client endpoint may implement some or all of the operation 215 and the operation 220 described previously with reference to FIG. 2. Finally, an exemplary input module 485 may implement some or all of the operation 240 and the operation 245 of FIG. 2 by retrieving or accessing an updated feed provided, for example, by the service endpoint—including the outgoing feed 432 or the outgoing feed N 434, and by updating data stored or accessed using the storage module 470.

It should be noted that the exemplary modules associated with the system 400 may not represent single discrete entities within a computer system and may instead be logically comprised of multiple applications, programs, libraries, and the like. For example, a user might maintain their contacts, calendar, and email information using a PIM application. Such an application might store the contact, calendar, and email information in a variety of ways, including as records in a database or in "opaque" files that might be generally only easily accessible, for example, through means provided the PIM application. The user might also maintain sales information using some other application that stores such sales information in another database, another file or set of files, or the like. In such an example, a storage module like the exemplary storage module 425 or the exemplary storage module 470 may comprise any or all of the stores associated with information that is part of a sharing relationship, including all databases, files, and so on, even when the stores are associated with or managed by a variety of applications. Similarly, a local update module 440 or local update module 465 might comprise multiple applications, including both the PIM and sales applications mentioned in this specific example, as long as the applications, programs, or the like, provide the capability of modifying the data outside of a merge operation. It should also be noted that while the term "local update" contains the word "local," that not all local updates must necessarily be performed on a single computer system, like the service endpoint 410 or client endpoint 460. In some embodiments, updates to the data items stored by a storage module might be initiated by or performed on, for example, some other computer or device that might be connected to the endpoint in some fashion.

It should also be noted that the merge module 420 may in some implementations access a single foreign feed, such as the outgoing feed 482, while in other implementations any number of foreign feeds, representing the same or different sets of data, may be accessed. One such additional feed may be represented by the exemplary outgoing feed N 484. Similarly, the generation module 430 may in some implementations generate only a single outgoing feed, such as outgoing feed 432, while in other implementations the generation module may generate any number of outgoing feeds that represent the same or different sets of data. One such additional outgoing feed might be represented by the exemplary outgoing feed N 434.

Also, while the client endpoint 460 is shown herein without a merge module, in some implementations a client endpoint may also contain additional modules, including a merge module, that may enable the client endpoint to, for example, perform merge operations locally or without the assistance of another endpoint. In such implementations, a client may, for example, retrieve feeds from other endpoints itself and merge changes from other endpoints locally, but may still use a service endpoint, such as the service endpoint 410, to access other functionality. For example, as was previously described, the client endpoint might use a service endpoint to store feeds and make feeds available to other endpoints.

Simple Sharing Extensions

As has been described previously, various operations performed as part of sharing items may be implemented using, among other techniques, one or more extensions to existing feed protocols, including SSE. Some of the following description provides more information about SSE, including exemplary feeds and operations such as additions, modifications, and merges.

Figure 5:
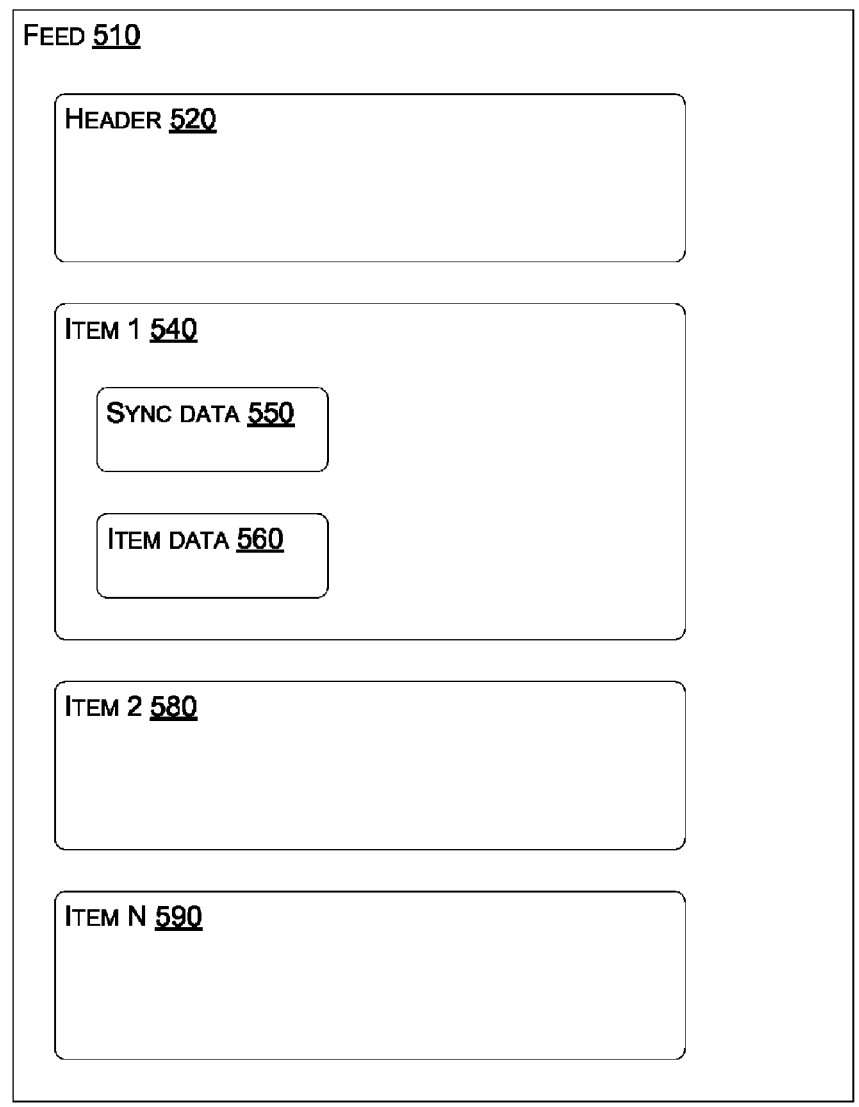
FIG. 5 illustrates an exemplary system that includes an exemplary graphical example of a feed.

Turning now to FIG. 5, shown therein is an exemplary system 500 that includes a graphical example of a feed 510. A feed 510 might contain a header 520 as well as some number of items including, in some examples, item 1 540, item 2 580, and item N 590. Each item might contain sync data 550 and item data 560. This description of FIG. 5 may be made with reference to other figures. However, it should be understood that the elements described with reference to FIG. 5 are not intended to be limited to being used with the elements described with reference to other figures. In addition, while the exemplary diagram in FIG. 5 indicates particular elements, in some implementations not all of these elements may exist, and in some implementations additional elements may exist.

A feed may be represented using any of a wide variety of formats. Generally, however, a feed might contain information necessary to communicate item data and sync data, where item data might be data associated with the particular items being shared as part of the feed and sync data might be additional data required or useful for implementing the synchronization of the items. In some implementations, a feed might use a syndication or data sharing format, such as RSS or Atom. In another example, a feed might use a list-processing format, like Outline Processor Markup Language (OPML). In yet another example, a feed might use some other method for sharing data that does not use XML.

Regardless of the format used by the feed, an exemplary feed 510 may in some cases contain a header with header information that may be general to the entire feed, such as the exemplary header 520. In the case where the feed uses RSS, the header 520 might contain some or all of some standard RSS header elements, such as the "rss" element, the "channel" element, the "title" element, the "description" element, and so on.

The header might also contain data, in some cases also represented using XML elements, such as the data described in the following paragraphs. While this data may be described with reference to XML elements, XML attributes, RSS, and so on, the use of XML or RSS is not required. A header, or the entire feed for that matter, may contain some or all of this data and may represent the data in a variety of formats. For example, a header represented using RSS might contain an RSS "channel" element and a "sharing" element beneath the "channel" element. The "sharing" element might in turn contain a number of attributes and sub-elements. However, such a representation—using RSS, XML elements, XML attributes, and so on—is provided for exemplary purposes only. The data represented in such an example may also be represented in any of a wide number of alternate formats.

As just one example, the header 520 might contain information like the following:

```
<channel>
    <sx:sharing since="Tue, 1 Nov 2004 09:43:33 GMT"
        until="Fri, 1 Mar 2005 09:43:33 GMT" version="0.92" >
        <sx:related link="http://x.com/all.xml" type="complete" />
        <sx:related link="http://y.net/B.xml" type="aggregated"
            title="Family Contacts (Dads Copy)" />
        <sx:related link="http://y.net/C.xml" type="aggregated"
            title="Family Contacts (Suzys Copy)" />
    </sx:sharing>
    ...
</channel>
```

In this example, the "channel" element might be the standard RSS "channel" element (other standard RSS header information, like the "title" and "description" elements may exist, and, if so, is not shown). In this example the use of the string "sx:" might indicate a particular XML namespace, perhaps including a namespace related to sharing and synchronizing data as described herein. The use of such an XML namespace prefix may not be required for the sharing of data, except as may be required, for example, by the particular format or formats used to represent the feed. For example, if the feed is represented using XML, one or more namespaces might be used or required.

The header 520 might contain header data like that represented in this example by the "sharing" element including some or all of the "since", "until", and "version" attributes, or the like.

Such data might include a value associated with an attribute like "since", which might represent the date-time from which all items in the feed have been incorporated. In some implementations, a feed might include only the most recent modifications, additions, and deletions within some reasonable time window. In some implementations, these feeds might be referred to as "partial" feeds, whereas feeds containing the complete set of items may be referred to as "complete" feeds. New subscribers to a feed might then initially copy a complete set of items from a publisher before having the ability to process incremental updates. Data like that represented by a "since" attribute might be useful, for example and in addition to other data described herein, as part of an implementation of partial and complete feeds. A partial feed might reference the complete feed, for example, by using one or more links or references in the partial feed. By placing a link to a complete feed, for example, in the channel descriptor, only a reference to the partial feed might need to be distributed to potential subscribers. If such an attribute is not present, the "beginning of time" might be assumed, such that the feed contains the endpoint's complete set of data as of the date-time value represented by the "until" value.

The data might also include a value associated with an attribute like "until", which might represent the last date-time when items were incorporated into the feed. The publisher of the feed might guarantee that the value associated with the "until" attribute will increase if any items in the feed are updated. If this attribute is omitted or blank, the subscriber to the feed might not be able to make assumptions about when the feed was updated.

The data might also include a value associated with an attribute like "version", which might represent the version of a specification—including rules about generating and merging content—that was used when the feed was generated.

In some implementations, the data might also include a value associated with an attribute like "window", which might represent the maximum period of time, in days or some other unit, that might elapse after the value associated with the "until" attribute, before a subscriber is no longer able to synchronize with the feed. Subscribers might use this value to determine the frequency with which they should read a feed, as well as when to read the complete feed in the cases where partial feeds exist. Publishers might use this value for a variety of purposes, including to determine when to remove items from partial feeds, to determine when to actually delete data associated with items that have a "deleted" attribute set to "true", and to determine when to delete items associated with a "resolvedconflicts" element (exemplary "deleted" and "resolvedconflicts" elements are described in more detail below).

In some implementations, one or more pieces of data associated with feeds related to a particular feed might be used. In some cases, like the previously presented example, this data might be represented using one or more "related" elements that are children of a "sharing" element. A "related" element might contain some or all of "link", "title", "type", "since", and "until" attributes, or the like.

Such data might include a value associated with an attribute like "link", which might represent a URL or other reference to a related feed. The data might also include a value associated with an attribute like "title", which might contain a name or description of the related feed.

The data might also include a value associated with an attribute like "type", which might contain as data either "complete" or "aggregated". The value "complete" might be used when the link references a feed that contains a complete set of items associated with the feed. The value "aggregated" might be used when the link references a feed whose contents are being incorporated into this feed by the publisher. In some implementations—for example, in the case where a publisher has aggregated information from other feeds into a larger work—it may be useful for subscribers to see more detailed information about the other feeds. This data might also be used to provide information to subscribing feeds about the feeds of other participants, to which they might also wish to subscribe.

The data might also include a value associated with an attribute like "since", which might represent the starting point of the related feed. If this attribute is omitted or blank, it might be assumed that this is a complete feed. The data might also include a value associated with an attribute like "until", which might represent the ending point of the feed.

In addition to a header 520, an exemplary feed 510 may generally contain one or more item elements, such as item 1 540, item 2 580, and item N 590. Generally, each item element may contain one or both of sync data 550 and item data 560. In an implementation where the feed is provided using RSS, an item, like item 1 540, may be associated with the "item" element defined and used in RSS. (Again, as has been described, feeds may be represented in a wide variety of formats, and are not limited to RSS, XML, or the like.)

When using RSS, as just one example, an item element, like item 1 540, might contain information like the following:

```
<item>
    <sx:sync id="0a7903db47fb0ae8" version="1">
        <sx:history when="Sat, 21 May 2005 09:43:33 GMT"
        by="UserXDeviceY"/>
    </sx:sync>
    <title>This is a test title</title>
    <description>This is a test item description.</description>
</item>
```

Item data 560 may generally comprise information related to the item itself. In the previous example, the item data 560 might include the RSS "title" and "description" elements. In another example, if a feed contains an item for each of a specified set of contacts, the item data 560 might generally contain information about a particular contact's name, address, phone number(s), and so on. The item data information might be represented in any of a wide variety of formats. In the case of contact information, for example, the item information might be represented using the hCard standard, the vCard standard, or any other format that contains contact information. It is noted that the item data may be stored in any format and is not limited to, for example, XML, XHTML, or any other standardized method for representing information. If a feed is associated with information typically represented in binary form, like audio data or image data, the item data might include such binary information, and so on. The item data may also be stored outside of the feed. In such an implementation, the feed may reference the item data, perhaps using an element like the RSS "enclosure" element.

Sync data 550 generally comprises information associated with the sharing and synchronization of the associated item data. In some implementations this might include data represented, for example, using a "sync" element that might have some or all of the "id", "version", "deleted", and "noconflicts" attributes, or the like, as well as additional attributes. The sync data 550 might also include elements that are, in some implementations, children of a "sync" element, including, for example and without limitation, "history", "update" (which might be a child of a "history" element), "conflicts", and "resolvedconflicts", and the like, as well as additional elements. In some implementations, items that include a valid sync data element 550, or the like, may be considered to be "configured for sharing," in that they may contain information used when sharing the item between multiple endpoints.

Such data might include a value associated with an attribute like "id", which might represent the identifier for the particular item. The value of this attribute may in some implementations be unique within a feed and might also be globally unique across feeds if an item is being shared or synchronized. In some implementations, the value of this attribute might be assigned by the creator of the item, and should not be changed by subsequent publishers.

Such data might also include a value associated with an attribute like "version", which might represent the modification sequence number of the item. In some implementations this value might start at "1" and increment by one indefinitely for each subsequent modification.

Such data might also include a value associated with an attribute like "deleted". Such an attribute, if present and when the associated value is "true", might indicate that the associated item has been deleted and that the remaining data is a "tombstone" useful, for example, to propagate deletions. If this attribute is not present, or if it is present with value of "false", then the item might be considered to not be deleted.

Such data might also include a value associated with an attribute like "noconflicts". Such an attribute, if present and when its associated value is "true", might indicate that particular parts of conflict processing, including perhaps conflict detection and conflict preservation, should not be performed for the associated item. Some possible implementations associated with conflict processing are described below. If this attribute is not present, or if it is present with a value of "false", then it might indicate that conflict processing should be performed for the item.

In addition to attributes that might be used with a "sync" element, or the like, some implementations may maintain the chronological change history for an element, possibly through the use of an element that is a child of the "sync" element, and that might, in some implementations, have the name "history". In some implementations, such an element might have some or all of "when" and "by" attributes, or the like, as well as additional attributes. A "history" element might also, in some implementations, sometimes have one or more "update" elements as children, as well as additional elements. An exemplary "update" element is described in more detail below.

Information associated with a change history might include a value associated with an attribute like "when", which might represent the date-time when the most recent modification of the associated item took place. If this attribute is omitted the value might default to the earliest time that can be represented using, for example, the date format specified by the Internet Engineering Task Force (IETF) RFC 822.

Such data might also include a value associated with an attribute like "by", which might identify the unique endpoint or entity that made the most recent modification. In some implementations, the associated value might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

In some implementations at least one of the "when" or "by" attributes must be present—in such implementations it may be invalid to have neither.

In some implementations, some parts of an item's change history might be maintained through the use of an "update" element, or the like, as part of the item's sync data 560. In some of these implementations, each "update" element might represent a distinct update operation applied to the associated item. In some implementations a new "update" element might be created each time the item is updated.

As just one example, the following XML fragment might indicate that the particular item was modified on May 21, 2005—as is indicated by the "update" element—and then modified again, more recently, on May 23, 2005—as is indicated by the "history" element:

```
<item>
    <sx:sync id="0a7903db47fb0ae8" version="1">
        <sx:history when="Mon, 23 May 2005 09:43:33 GMT"
        by="UserXDeviceY">
            <sx:update when="Sat, 21 May 2005 09:43:33 GMT"
            by="UserXDeviceY" />
        </sx:history>
    </sx:sync>
    <title>This is a test title</title>
    <description>This is a test item description.</description>
</item>
```

In some implementations, an "update" element might have one or both the "when" and "by" attributes, as well as other attributes.

Such data might include a value associated with an attribute like "when", which might represent the date-time when the modification associated with this update took place. If this attribute is omitted the value might default to the earliest time that can be represented using, for example, the date format specified by IETF RFC 822.

Such data might also include a value associated with an attribute like "by", which might identify the unique endpoint that made the modification associated with this update. In some implementations, the value of this attribute might be some combination of a user and a device (which might enable a given user to edit a feed on multiple devices). In some implementations, the value of this attribute might be used programmatically to break ties in the case where two changes were made at the same time (for example, within the same second). In some embodiments, if this attribute is omitted the value may default to the empty string, which might be less than all other values for purposes of collation and determining the item that takes precedence for various operations.

Like with the "history" element, in some implementations, at least one of the "when" or "by" attributes must be present—in such implementations it may be invalid to have neither.

Another set of elements that might be part of an item's sync data 550 might be a conflict collection and a resolved conflict collection, perhaps represented using a "conflicts" element and a "resolvedconflicts" element, or the like. Both of these elements might be used, for example, as part of a conflict preservation implementation. Such an implementation might preserve, for example, the "losing" change when two changes conflict. Some examples of conflict preservation implementations are described below, for example, with reference to FIG. 8, FIG. 9, FIG. 10, and FIG. 11.

Figure 6:
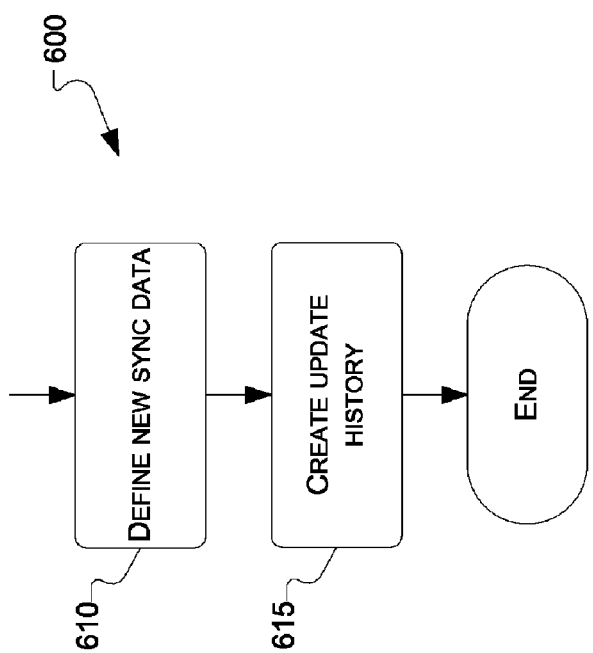
FIG. 6 illustrates an exemplary generalized operational flow including various operations that may be performed when modifying an item to include sharing and synchronization data.

Turning now to FIG. 6, shown therein is an exemplary generalized operational flow 600 including various operations that may be performed when modifying an item to include sharing and synchronization data. The following description of FIG. 6 may be made with reference to other figures. However, it should be understood that the operational flow described with reference to FIG. 6 is not intended to be limited to being used with the elements described with reference to these other figures. In addition, while the exemplary operational flow of FIG. 6 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

The operations described in the exemplary operational flow 600 may generally be performed when an item that has not previously been configured for sharing or synchronization is to be shared. One example of when such operations might be performed is when a new item is created as a result of a local user operation. For example, if a user is synchronizing her contact information and creates a new contact, the operations described with reference to FIG. 6 might be performed so that the contact contains the minimum set of sharing information necessary for the sharing of that contact. Another example of when such operations might be performed might be when a set of items that already exists but that is not configured for synchronization is extended to support sharing and synchronization.

In one example of operation 610, new sync data may be defined. This new sync data might include, for example, a unique identifier and an initial version value. In some cases the initial version value may be a starting version of "1". Further, in implementations that, for example, generate a feed that is represented using XML, this operation might result in the creation of a new "sync" element, or the like, or the definition or creation of data that ultimately results in the creation or generation of a "sync" element when a feed is generated. In such implementations, or in other implementations, the unique identifier data might be associated with an "id" attribute and the version information might be associated with a "version" attribute.

In an exemplary implementation of operation 615, an update history may be created. The newly created update history may contain information about this initial update, perhaps specified using one or both of values that define when the information was defined and by whom the information was defined. In implementations that, for example, generate a feed that is represented using XML, this operation might result in the creation of a new "history" element, or the like, or the definition or creation of data that ultimately results in the generation of a "history" element when a feed is generated. In such implementations, or in other implementations, the time when this information was defined might be associated with a "when" attribute and the entity that defined this information might be associated with a "by" attribute.

As just one example, consider the following RSS item, represented using XML, as it might exist before the operations of the exemplary operational flow 600 are performed:

```
<item>
    <title>This is a test title</title>
    <description>This is a test item description.</description>
</item>
```

After the operations of the exemplary operational flow 600 have been performed, the same item might be represented in a feed as follows:

```
<item>
    <sx:sync id="0a7903db47fb0ae8" version="1">
        <sx:history when="Sat, 21 May 2005 09:43:33 GMT"
        by="UserXDeviceY"/>
    </sx:sync>
    <title>This is a test title</title>
    <description>This is a test item description.</description>
</item>
```

In some implementations, the information defined by the operations of the exemplary operational flow 600 might be considered to form at least part of the sync data 550 described previously with reference to FIG. 5. In the same or other implementations, the item data that existed before the execution of the exemplary operational flow 600 might be considered to form at least part of the item data 560 also described previously with reference to FIG. 5.

Figure 7:
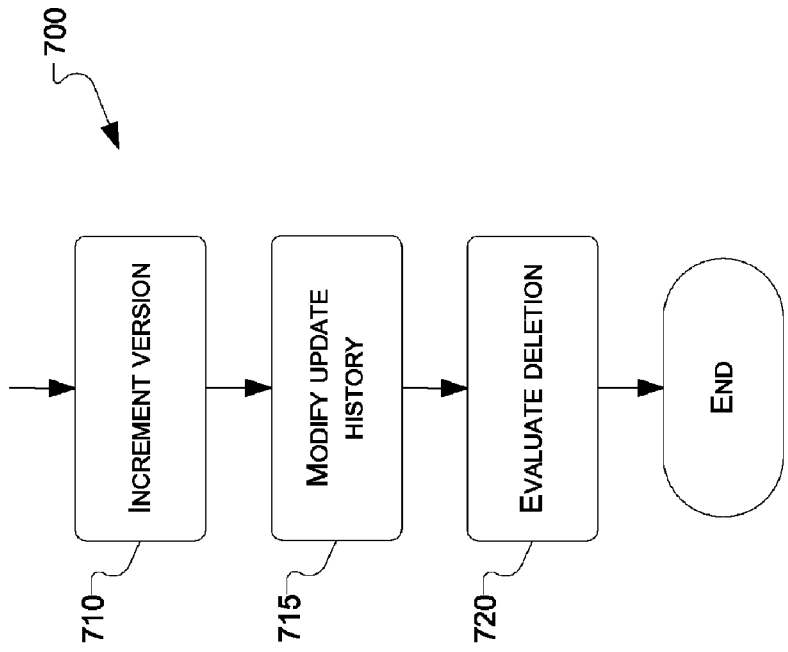
FIG. 7 illustrates an exemplary generalized operational flow including various operations that may be performed when performing a local update of an item.

Turning now to FIG. 7, shown therein is an exemplary generalized operational flow 700 including various operations that may be performed when performing a local update of an item. The following description of FIG. 7 may be made with reference to other figures. However, it should be understood that the operational flow described with reference to FIG. 7 is not intended to be limited to being used with the elements described with reference to these other figures. In addition, while the exemplary operational flow of FIG. 7 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

As before, a local update, as performed by the operations of the exemplary operational flow 700, may be defined as an update that is performed outside of a merge operation. Such a local update may include both the modification of an item—for example, this might include the modification of a contact's address or phone number in a contact item—as well as the deletion of an item.

In an exemplary implementation of operation 710 the version data associated with the item may be incremented, for example, by one. In implementations that, for example, generate a feed that is represented using XML, this operation might result in a change to the value associated with a "version" attribute. If the previous value of the version attribute was "1" a new value might be "2", and so on.

In one implementation of operation 715, the update history of the item might be modified so as to capture information about when this particular modification takes place and also, in some implementations, to maintain at least some information about previous modifications. One possible implementation of this operation might involve first creating a new "update" element, or the like, as the first member of the existing update history (in doing so, any previously existing update information might be moved down in order). Note that, as has been previously stated, while this operation, and others, may be described in some cases in the context of concepts related to XML including, for example, elements and attributes, these descriptions are in no way limiting to an implementation that only uses or results in XML data. For example, in some implementations an update history, including the information described as residing, in some implementations, in "history" and "update" elements, might be created and maintained in memory, using database records or other data structures, and the like. In any implementations, the relevant information may never be stored, persisted, or communicated as XML. Some of the descriptions provided herein use XML concepts only for ease of explanation.

To set the values of the "when" (modification time) and "by" (modifying entity) attributes of the new "update" element, operation 715 might copy the corresponding data from the current "history" element. In doing so, data about the most recent previous modification—which may have been previously recorded with "when" and "by" values in the "history" element—may now be saved in the new "update" element, and so may not be lost if the data associated with the "history" element is updated.

In some implementations, operation 715 may truncate the update history by deleting some or all of the "update" elements. In implementations that truncate the update history, the "update" elements may generally be deleted in reverse order of their creation so that older update history is deleted before newer update history.

Finally, operation 715 might set one or both of the "when" (again, modification time) and "by" (again, modifying entity) attributes of the top-level "history" element to the current time and entity making this modification, respectively.

In one implementation of operation 720, further steps may be performed in the case where the modification is a deletion of the item. When this is the case, in some implementations the "deleted" attribute of the top-level "sync" element may be set to "true". In some implementations, the data associated with the item may also be physically deleted. However, in at least some implementations the top-level "item" element as well as the "sync" element and its children might be retained. (In implementations that use the concept of partial feeds, the actual "item" and "sync" element may be physically deleted when allowed, as defined by the "window" attribute of the "sharing" element, and as described previously with reference to FIG. 5.)

As just one example, consider the following RSS item, represented using XML, as it might exist after having been modified three times in sequence, once per day, by the same endpoint:

```
<item>
  <sx:sync id="0a7903db47fb0ae8" version="4">
    <sx:history when="Tue, 24 May 2005 09:43:33 GMT"
      by="UserXDeviceY">
      <sx:update when="Mon, 23 May 2005 09:43:33 GMT"
        by="UserXDeviceY" />
      <sx:update when="Sun, 22 May 2005 09:43:33 GMT"
        by="UserXDeviceY" />
      <sx:update when="Sat, 21 May 2005 09:43:33 GMT"
        by="UserXDeviceY" />
    </sx:history>
  </sx:sync>
  <title>This is a test title</title>
  <description>This is a test item description.</description>
</item>
```

In this example, the execution of the exemplary operational flow 700 three different times has resulted in the creation of three "update" elements that represent the time at which the modification took place and the entity that made the modification.

If this particular RSS item is modified again two more times, once per day, and the particular implementation only maintains the most recent three versions, the resulting item might look as follows, represented as XML:

```
<item>
  <sx:sync id="0a7903db47fb0ae8" version="6">
    <sx:history when="Thu, 26 May 2005 09:43:33 GMT"
      by="UserXDeviceY">
      <sx:update when="Wed, 25 May 2005 09:43:33 GMT"
        by="UserXDeviceY" />
      <sx:update when="Tue, 24 May 2005 09:43:33 GMT"
        by="UserXDeviceY" />
      <sx:update when="Mon, 23 May 2005 09:43:33 GMT"
        by="UserXDeviceY" />
```

-continued

```
        </sx:history>
      </sx:sync>
      <title>This is a test title</title>
      <description>This is a test item description.</description>
    </item>
```

Figure 8:
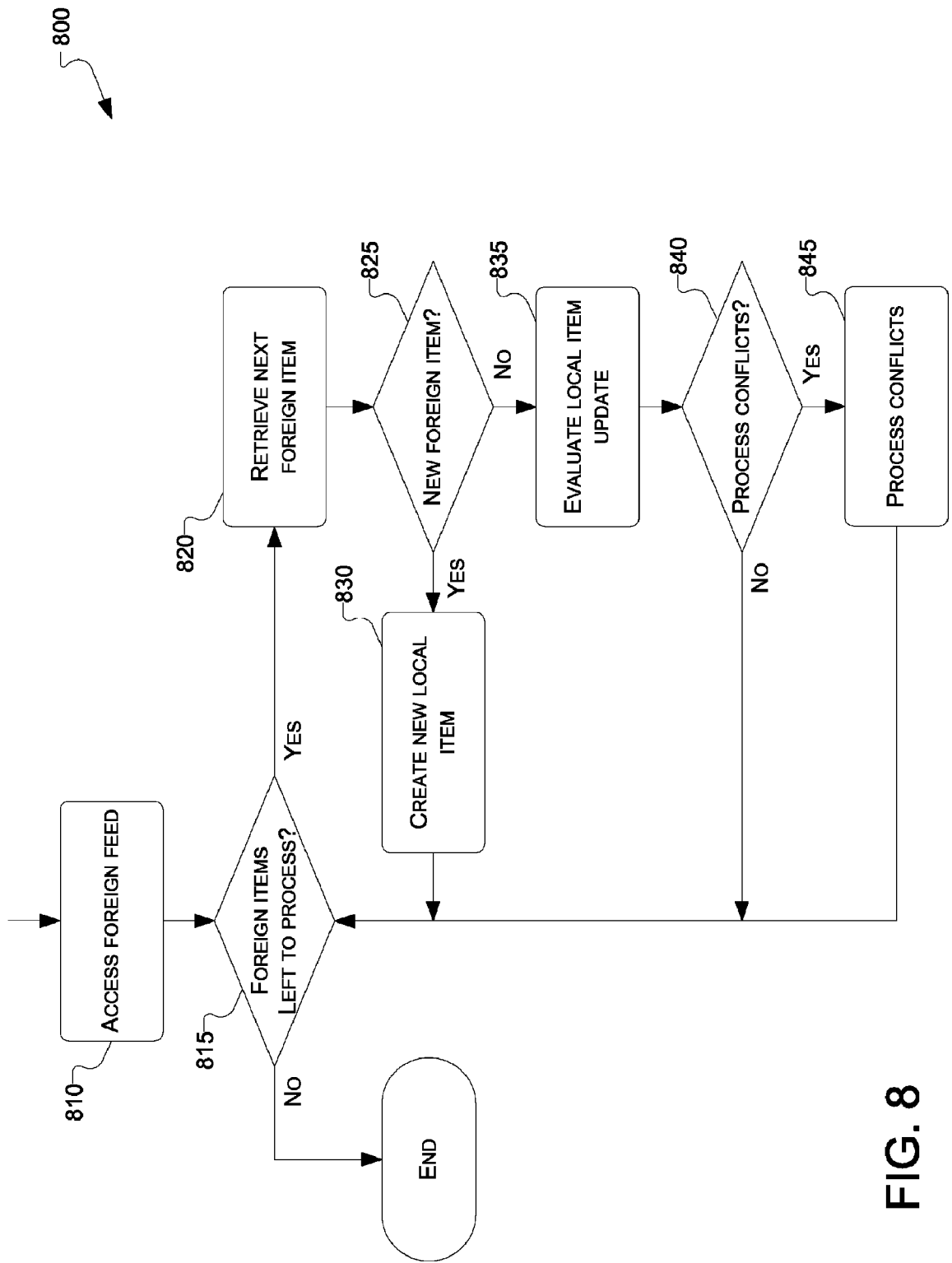
FIG. 8 illustrates an exemplary generalized operational flow that includes various operations that might be performed when merging changes made by another endpoint with the data maintained by a local implementation of an endpoint.

Turning now to FIG. 8, shown therein is an exemplary generalized operational flow 800 that includes various operations that might be performed when merging changes made by another endpoint with the data maintained by a local implementation of an endpoint. The following description of FIG. 8 may be made with reference to other figures. However, it should be understood that the operational flow described with reference to FIG. 8 is not intended to be limited to being used with the elements described with reference to these other figures. In addition, while the exemplary operational flow of FIG. 8 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 810, a foreign feed that contains information about the items synchronized between two endpoints may be accessed. In some embodiments, a foreign feed may be made up of items that each may contain item data and sync data, for example, perhaps as further described previously with reference to FIG. 5. In some implementations, the foreign feed may be the feed communicated to a service endpoint, as described in operation 220 of FIG. 2, and received by a service endpoint, as described in operation 225 of FIG. 2. In these implementations, at least part of the implementation of operation 230 of FIG. 2 may be performed using at least some of the operations described herein with reference to FIG. 8. In the same or other implementations, the merge module 420 of FIG. 4 may perform some or all of the operations described herein with reference to FIG. 8. In such implementations, the merge module 420 and the operations described with reference to FIG. 8 may operate using, for example, one of the outgoing feed 482 or the outgoing feed N 484 as the foreign feed.

In general, a foreign feed may be provided in some fashion by another endpoint. For example, the operation of accessing the foreign feed may in some implementations involve using a network to physically retrieve a file or files that contain the foreign feed. Because the mechanism by which the foreign feed is accessed or transmitted may be irrelevant to the operation of the steps illustrated with reference to FIG. 8, this step may also encompass any other means by which a foreign feed may be accessed, including manual transfer of data using some other form of storage including a CD, a flash drive, a physical printout of data on paper, and so on. A particular foreign feed may not necessarily contain all of the items synchronized by a particular endpoint—for example, an endpoint may synchronize with multiple foreign feeds, each which may contain the same or a different set of items.

It should be noted that while some of the preceding and following description may refer to the foreign feed as, for example, an XML document that contains item and sharing information perhaps like that described elsewhere in this specification, the foreign feed is not so limited. For example, the foreign feed may not necessarily always be provided as an XML document. Any feed provided by another endpoint that contains item and sharing information may possibly be accessed or used as described in this operation and the operational flow 800.

In at least one implementation of operation 815, it may be determined if the foreign feed contains any foreign items that have not yet been processed. In this context, the term "foreign item" may refer to an item defined by the foreign feed, in contrast to a "local item," which may refer to an item stored or managed by the entity that accesses the foreign feed, including, in some implementations, the entity or entities that execute the operational flow 800. If there are no remaining foreign items to process, the operational flow ends. If the foreign feed contains at least one item that has not yet been processed, the exemplary operational flow proceeds to operation 820.

In an exemplary implementation of operation 820, the next foreign item is retrieved from or identified using the foreign feed. For example, if the foreign feed is associated with five foreign items, the first time operation 820 is executed, one of these items may be retrieved. The next time operation 820 is executed, another of these items may be retrieved, and so on. This may continue until all foreign items have been retrieved, at which point operation 815 stops any further retrieval.

In at least one implementation of operation 825, it is determined if the current foreign item—that is, the foreign item retrieved in the most recent execution of operation 820—is a new item that the endpoint performing the exemplary operational flow 800 has not yet evaluated. In some implementations, this operation may be performed by determining if a data store that contains local items and is managed or accessible from the local endpoint contains an item that has the same unique identifier as the current foreign item. If no such local item exists, the foreign item may be determined to be new, and the operational flow may proceed to operation 830. If the local data store contains an item with the same unique identifier as the foreign item, the foreign item may not be considered new, and the operational flow may proceed to operation 835.

If the foreign item is new, the operational flow may proceed to operation 830 where, in an exemplary implementation, data from the foreign item may be used to create a corresponding local item. The implementation of this operation may vary according to different factors including how, for example, local items are stored. In some implementations, this operation may be performed by creating a new database record or records, a new data structure or data structures, and so on, and setting the rows, fields, or the like by copying information from the foreign item. In other implementations, this operation may be performed by copying the information from the foreign item into a feed document maintained locally, and so on.

If the foreign item is not new, the operational flow may proceed to operation 835 where, in at least some implementations, data from the foreign item is used to evaluate if and how the corresponding local item should be updated. For example, data from the foreign item may be determined to be more recent than data from the local item, and so may in some cases overwrite the corresponding data in the local item. A number of other operations may occur as part of the evaluate local item update operation. An exemplary implementation of these other operations is described in more detail below, with reference to FIG. 9. It should be noted that, in at least some implementations, data that is overwritten may need to be saved, at least until the remaining operations that relate to this foreign item are performed. For example, an operation related to processing conflicts may use some of the data that might be overwritten as part of operation 835.

In an exemplary implementation of operation 840, it may be determined if it is necessary to process conflicts associated with the foreign item and the local item. If no conflict processing is needed, the operational flow may proceed to operation 815. If conflict processing is required, the operational flow may proceed to operation 845. This determination may be made in a variety of ways, including by, for example, determining if the foreign item, the local item, or both items contain a flag or some other data that indicates if conflicts should be or should not be processed. In some implementations, such a flag might be the "noconflicts" attribute described previously, for example with reference to FIG. 5. In these implementations, if the "noconflicts" attribute exists and is set to "true", no conflict processing may be necessary.

If conflict processing is indicated, the operational flow may proceed to operation 845, where, in an exemplary implementation, potential conflicts between the foreign item and the local item may be processed. The steps executed during conflict processing may vary in different implementations and may include one or both of a conflict detection operation and a conflict preservation option. One implementation of conflict processing operations, such as these, is described in more detail below, with reference to FIG. 10.

Figure 9:
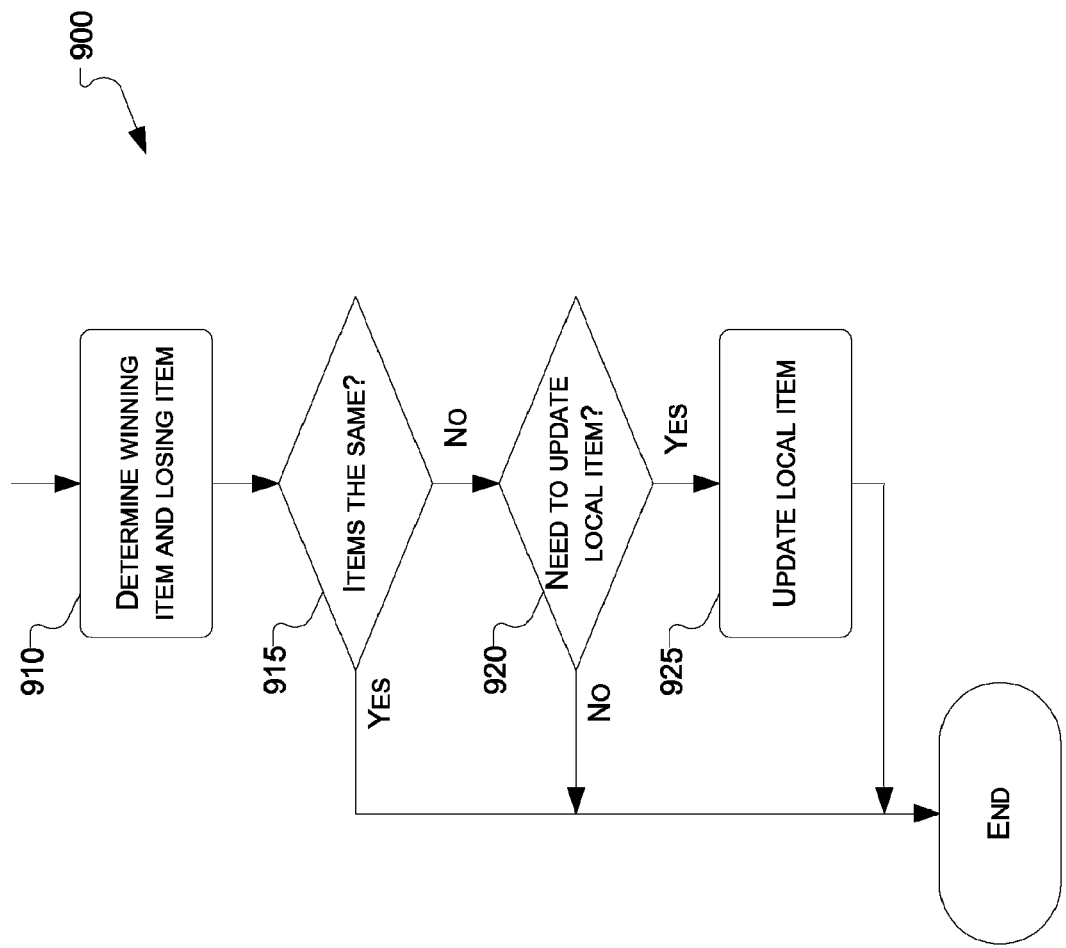
FIG. 9 illustrates an exemplary generalized operational flow that includes operations that might be performed as part of evaluating how a local item might be updated during a merge operation.

Turning now to FIG. 9, shown therein is an exemplary generalized operational flow 900 that includes operations that might be performed as part of evaluating how a local item might be updated during a merge operation. In some implementations, the steps described in FIG. 9 may be used as all or part of an implementation of operation 835 described previously with reference to FIG. 8. This description of FIG. 9 may be made with reference to other figures. However, it should be understood that the operational flow described with reference to FIG. 9 is not intended to be limited to being used with the elements described with reference to these other figures. In addition, while the exemplary operational flow of FIG. 9 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 910, a "winning item" and "losing item" may be determined from two items presented. For example, when the operations in the operational flow 900 are used in the context of the merge operational flow 800 described previously with reference to FIG. 8, the two items presented may comprise the foreign item and the local item identified as part of the merge operational flow 800. One of these items may be selected to be the winning item, which in some implementations is the item that is determined to have precedence, for some reason or reasons, and the other item may be selected to be the losing item. Furthermore, in some cases neither item may be determined to be the winning item or the losing item.

In some implementations, the determination of the winning item and the losing item may be made by comparing data associated with both items. For example, the winning item and losing item may be determined by a comparison of the current version of the items, the most recent time the items were modified, and the entities that performed the most recent item modification. In the case where the items are similar to those described previously with reference to FIG. 5, this data may be determined, for example, using the "version" attribute of the "sync" element, the "when" attribute of the "history" element, and "by" attribute of the "history" element, respectively. In such an implementation, the version data may be compared first, and an item with a greater version number may be determined to be the winning item. If both items have the same version, the most recent modification time may be compared, and the item with the more recent modification time may be determined to be the winning item. If both modifications were performed at the same time (for example, within the same second), then the entities that performed the modifications may be compared, and the item that has the entity with the "greater" value—as determined by text comparison, for example—may be determined to be the winning item. In implementations where the modification time and modifying entity are not necessarily required to be defined for each item, a comparison may determine that a winning item is the item that has data for a particular field—for example, if only one of the items has a modification time defined, that item may be determined to be the winner in a comparison of modification times.

If one item is determined to be the winning item, the other item may be determined to be the losing item. If neither item is determined to be the winning item, then neither item may be determined to be the winning item or the losing item.

In an exemplary implementation of operation 915, it is determined if the items are considered the "same" for the purposes of updating the local item. In one implementation, this operation may use the results of the previous operation 910. If neither item was identified as the winning item in operation 910, then the items may be considered to be the same, and the operational flow 900 may end. If operation 910 determined a winning item and a losing item, then the items may be determined to not be the same, and the operational flow 900 may proceed to operation 920. Note that in some implementations, the determination of whether the items are the same may use only the synchronization data associated with each item—like the version, modification time, and modifying entity—as described above, for example. In these or other implementations, the determination of whether the items are the same may not use item data, like contact information when the item represents a contact, image information when the item represents an image, and so on. This may mean that the item data associated with each of the two items is different even when the items are determined to be the same in this operation, and vice versa.

In at least one implementation of operation 920, it may be determined whether the local item needs to be updated. For example, when the operational flow 900 exists in the context of some other set of operations that provide a foreign item and a local item, like when the operational flow is executed as part of the merge operational flow 800, this operation may determine if the local item should be updated. In some implementations, it may be determined that the local item should be updated if the foreign item was determined to be the winning item. For example, this might be the case if the foreign item had a greater version number than the local item or had a more recent modification time than the local item. If the local item needs to be updated, the operational flow 900 proceeds to operation 925; otherwise, the operational flow ends.

In an exemplary implementation of operation 925, the local item may be updated. The implementation of this operation may vary according to how, for example, local items are stored. In some implementations, this operation may be performed by modifying a database record or records, a data structure or data structures, and so on, that may store data about the local items, by copying data from the foreign item. In other implementations, this operation may be performed by copying information from the foreign item into a feed document maintained locally, and so on. In at least some cases, both the synchronization data and the item data may be copied and used to update the local item. This means that, as a result, the local item now may have the same item data, same update history, same version, and so on, as the foreign item.

Figure 10:
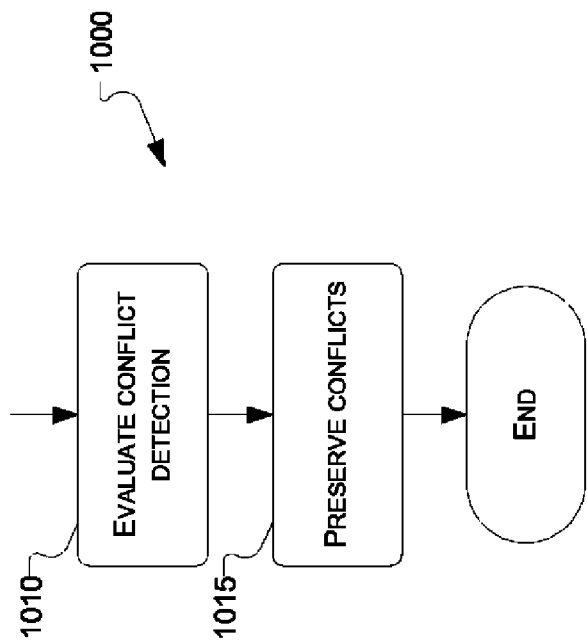
FIG. 10 illustrates an exemplary generalized operational flow that includes operations that might be performed when processing conflicts.

Turning now to FIG. 10, shown therein is an exemplary generalized operational flow 1000 that includes operations that might be performed when processing conflicts. In some implementations, the steps described in FIG. 10 may be used as all or part of an implementation of operation 845 described previously with reference to FIG. 8. This description of FIG. 10 may be made with reference to other figures. However, it should be understood that the operational flow described with reference to FIG. 10 is not intended to be limited to being used with the elements described with reference to these other figures. In addition, while the exemplary operational flow of FIG. 10 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously.

In an exemplary implementation of operation 1010, it may be determined whether the two presented items are in conflict. In this context, the operational flow 1000 may be assumed to be operating with two items. Such items may be a winning item and losing item, as identified, for example, by the operations of operational flow 900 described previously with reference to FIG. 9. Such items may also be a foreign item and a local item, as described previously, for example, with reference to FIG. 8. In addition, as used herein, the term "in conflict" may refer to the case where separate modifications were made independently to the same item. For example, suppose the same item is modified by two different endpoints, and neither endpoint knows of the other endpoint's modification at the time the endpoint is making its own modification. Such items might be determined to be in conflict, for example, during a merge operation. When this definition of the term "in conflict" is used, it may be possible for items that have the same item data—for example, for a contact that has the same name, address, phone number(s), and so on—to still be determined to be in conflict. This might occur, in one example, if two endpoints independently modified, say, a phone number field of a contact to the same new phone number. In some implementations, additional processing—not described herein—may be used to determine if items like this are truly different.

One procedure for determining if the two items are in conflict in operation 1010 uses information about when and by whom modifications were made. For example, in an implementation that uses data described previously, for example, with reference to FIG. 5, or uses similar data, conflicts may be detected by first identifying the value of the "version" attribute of the "sync" element of the winning item, and defining this value as n. This value may then be decremented by the value of the "version" attribute of the "sync" element of the losing item, and the resulting value stored as an updated n. Then, the values of the "when" (modification time) and "by" (modifying entity) attributes of the losing item's "history" element may be compared with the values of the "when" and "by" attributes of the winning item's "update" element that corresponds to the value of n. If n is zero, then the values of the "when" and "by" attributes of the losing item's "history" element may be compared with the values of the "when" and "by" attributes of the winning item's "history" element.

If the identified "when" and "by" values are the same, or if the "update" element corresponding to n does not exist (when n is greater than zero), the items may be determined to not be in conflict. If the at least one of the "when" and "by" values are not the same, the items may be determined to be in conflict.

As one example of how this implementation of conflict detection might proceed, suppose one endpoint—perhaps called endpoint A—modified an item so the item's representation in a feed was:

```
<item>
    <sx:sync id="0a7903db47fb0ae8" version="3" deleted="false">
        <sx:history when="Thu, 6 Jul 2006 20:27:22 GMT"
            by="endpointA">
            <sx:update when="Thu, 6 Jul 2006 20:27:21 GMT"
                by="endpointA" />
            <sx:update when="Thu, 6 Jul 2006 20:27:20 GMT"
                by="endpointA" />
        </sx:history>
    </sx:sync>
    <title>This is a test title, modified by endpoint A</title>
    <description>This is a test item description.</description>
</item>
```

And suppose another endpoint—perhaps called endpoint B—modified an item so the item's representation in a feed was:

```
<item>
    <sx:sync id="0a7903db47fb0ae8" version="3" deleted="false">
        <sx:history when="Thu, 6 Jul 2006 20:27:23 GMT"
            by="endpointB">
            <sx:update when="Thu, 6 Jul 2006 20:27:21 GMT"
                by="endpointA" />
            <sx:update when="Thu, 6 Jul 2006 20:27:20 GMT"
                by="endpointA" />
        </sx:history>
    </sx:sync>
    <title>This is a test title, modified by endpoint B</title>
    <description>This is a test item description.</description>
</item>
```

As is evident when examining the "history" elements of both items, the "when" attribute of the "history" element associated with the item modified by endpoint B shows a modification time that is one second later than the modification time associated with the change made by endpoint A. Using the previously described operations and procedures, in some implementations the item modified by endpoint B would be determined to be the winning item, and the items would be determined to be in conflict. In terms of the conflict detection procedure, the value of n would be determined to be zero, because subtracting the value of the "version" attribute associated with the losing item ("3") from the value of the "version" attribute associated with the winning item ("3") results in the value of zero. Therefore, the values of the "when" and "by" attributes of the "history" elements associated with both items would be compared, and it would be seen that the values of the "when" attributes were different, therefore indicating that the items were in conflict.

In an exemplary implementation of operation 1015, some or all conflict data associated with both items in question may be preserved. In this context, "preserving conflict information" may refer to the preservation of item and synchronization data associated with conflicts. For example, suppose that two items were modified independently and were subsequently determined to be in conflict. Also suppose that the data associated with the winning item was to be used, or was already used, to overwrite the data associated with the losing item. As part of conflict preservation, in some implementations the data associated with the losing item may be preserved. This may lessen or eliminate data loss, and enable, for example, subsequent user intervention to determine if the "correct" data (as defined by a user, for example) was retained.

One procedure for preserving conflicts might use a "conflict collection" and a "resolved conflict collection." In implementations that use feeds that have XML representations, these collections might be implemented as, for example, elements named "conflicts" and "resolvedconflicts". The children of the "conflicts" and "resolvedconflicts" elements may in turn be, for example, one or more instances of "item" elements that existed at some time in losing items. When an "item" element is a member of a conflict collection or a resolved conflict collection, it may be referred to as a "conflict item", "conflict element", "resolved conflict item", or a "resolved conflict element". (Resolved conflicts are described in more detail below, with reference to FIG. 11.)

For example, in the previous exemplary description with reference to operation 1010, the item modified by endpoint A was determined to be the losing item. As a result of a conflict preservation operation like operation 1015, the data associated with the modification made by endpoint A might be preserved as part of the winning item, and may, for example, appear like the following in an XML representation of the feed:

Finally, in the case where the items were found to be in conflict—for example, they may have been found to be in conflict during operation 1010—the losing item may be preserved as part of the winning item's data. In at least some implementations, this might be implemented by deleting the losing item's conflict and resolved conflict collections (perhaps by removing the losing item's "conflicts" and "resolvedconflicts" elements), and by then appending the losing item to the winning item's conflict collection, perhaps by appending the losing item's "item" element to the winning item's "conflicts" element. The previously presented example XML showing a "conflicts" element demonstrates one exemplary manner in which this might be done for the described example.

Figure 11:
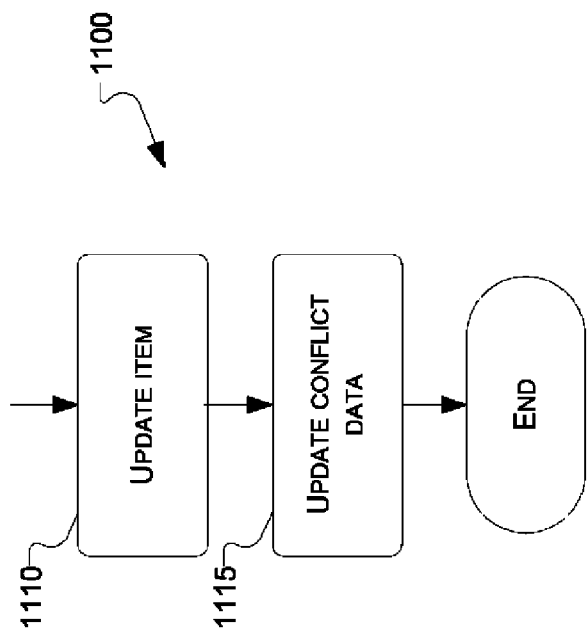
FIG. 11 illustrates an exemplary generalized operational flow that includes operations that might be performed as part of resolving conflicts.

Turning now to FIG. 11, shown therein is an exemplary generalized operational flow 1100 that includes operations that might be performed as part of resolving conflicts. This description of FIG. 11 may be made with reference to other figures. However, it should be understood that the operational flow described with reference to FIG. 11 is not intended to be limited to being used with the elements described with reference to these other figures. In addition, while the exemplary operational flow of FIG. 11 indicates a particular order of execution, in one or more alternative embodiments the operations may be ordered differently. Furthermore, while the exemplary operational flow contains multiple steps, it should

```
<item>
    <sx:sync id="0a7903db47fb0ae8" version="3" deleted="false">
        <sx:history when="Thu, 6 Jul 2006 20:27:23 GMT" by="endpointB">
            <sx:update when="Thu, 6 Jul 2006 20:27:21 GMT" by="endpointA" />
            <sx:update when="Thu, 6 Jul 2006 20:27:20 GMT" by="endpointA" />
        </sx:history>
        <sx:conflicts>
            <item>
                <sx:sync id="0a7903db47fb0ae8" version="3" deleted="false">
                    <sx:history when="Thu, 6 Jul 2006 20:27:22 GMT" by="endpointA">
                        <sx:update when="Thu, 6 Jul 2006 20:27:21 GMT" by="endpointA" />
                        <sx:update when="Thu, 6 Jul 2006 20:27:20 GMT" by="endpointA" />
                    </sx:history>
                </sx:sync>
                <title>This is a test title, modified by endpoint A</title>
                <description>This is a test item description.</description>
            </item>
        </sx:conflicts>
    </sx:sync>
    <title>This is a test title, modified by endpoint B</title>
    <description>This is a test item description.</description>
</item>
```

In one implementation of a conflict preservation procedure, if a losing item's conflict collection is not empty, any items in a losing item's conflict collection may be copied to the winning item's conflict collection. In this context, the term "identical" may mean that the items have the same values associated with the version, modification time, and modifying entity (i.e., they might have the same values for the "version", "when", and "by" attributes). If the winning item already has an identical item in its conflict collection, that particular item may not be copied. Similarly, if a losing item's resolved conflict collection is not empty, any items in the losing item's resolved conflict collection may be copied to the winning item's resolved conflict collection, unless the winning item already has an identical item in its resolved conflict collection. Then, any identical items that exist in both the winning item's conflict collection and the winning item's resolved conflict collection may be removed from the winning item's conflict collection.

be recognized that in some implementations at least some of these operations may be combined or executed contemporaneously.

Some implementations may provide the ability to "resolve a conflict," where such resolution may refer to the modification of an item after one or more conflicts associated with that item have been identified. In at least some cases, the resolution of conflicts may be performed by a user or some other entity outside of the context of the synchronization operations. For example, a user may examine the data identified by a merge procedure as the "winning" and "losing" data, and validate that the data chosen as the winning data was correct, that the losing data should have been chosen, or that some other data—perhaps in some cases a manual combination of pieces of data, for example—should instead be used.

In an exemplary implementation of operation 1110, an item may be updated with the appropriate data. In this context, the appropriate data may be selected from one of the following: the most recent item data (i.e., this might be the case if winning item identified in a merge procedure had the correct data); the data associated with one of the members of the item's conflict collection; and from some other source, including completely new data, some user-performed manual combination of existing and/or new data, and so on. In some implementations, such an update may need to be performed using the same procedures as other updates. For example, in implementations that use the modification operations previously described with reference to FIG. 7, the item's version may be incremented, the update history may be modified, and so on.

In at least one implementation of operation 1115, conflict data may be updated after the item itself is updated in operation 1110. As part of this operation, a resolved conflict collection may be created for the item, if one does not already exist. In cases where a feed is represented using XML, this may at some point result in the creation of a "resolvedconflicts" element. Then, any members of the item's conflict collection that are deemed to no longer be relevant or valid may be moved from the conflict collection to the resolved conflict collection. In cases where a feed is represented using XML, this may at some point result in moving items that are children of the "conflicts" element to be children of the "resolvedconflicts" element. In this context, whether a member of the conflict collection is no longer relevant or valid may be determined by the user or entity resolving the conflict. In some cases this may result in all of the members of the conflict collection being moved to the resolved conflict collection, while in other cases only some, or none, of the members of the conflict collection may be moved to the resolved conflict collection. For example, if a member of the conflict collection exists that is not addressed by the data used during the update item operation 1110, that member may remain in the conflict collection. After any items have been moved to the resolved conflict collection, if the conflict collection contains no remaining items, the conflict collection itself may be deleted which, in XML feed representations, may result in the removal of the "conflicts" element.

As just one example, using the example XML representation described previously with reference to operational flow 1000 and FIG. 10, after one possible conflict resolution procedure, an item might have the following representation:

In this example, the "title" element has been modified to contain new data, the version and update history of the item have been updated as part of the modification, the "item" element that was previously part of the conflict collection has been moved to the resolved conflict collection, and the conflict collection has been removed because it no longer contained any items.

Example Computing Environment

Figure 12:
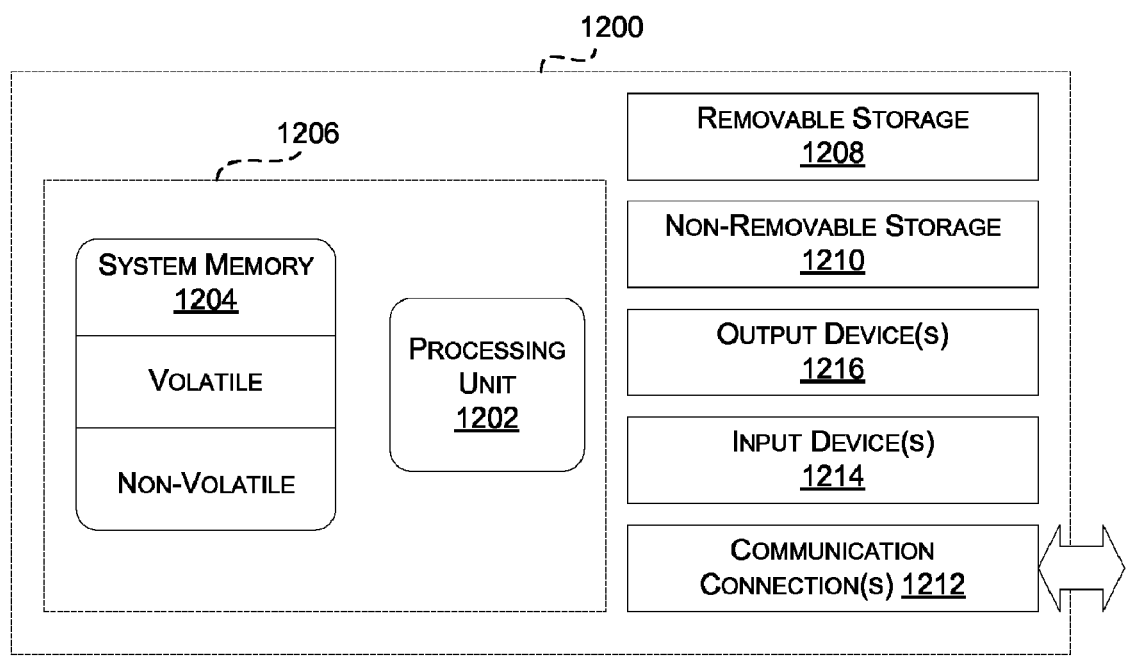
FIG. 12 illustrates an exemplary computer device in which the various technologies described herein may be implemented.

Turning now to FIG. 12, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 1200 illustrated in FIG. 12.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media

```
<item>
    <sx:sync id="0a7903db47fb0ae8" version="4" deleted="false">
        <sx:history when="Fri, 7 Jul 2006 20:27:24 GMT" by="endpointB">
            <sx:update when="Thu, 6 Jul 2006 20:27:23 GMT" by="endpointB">
            <sx:update when="Thu, 6 Jul 2006 20:27:21 GMT" by="endpointA" />
            <sx:update when="Thu, 6 Jul 2006 20:27:20 GMT" by="endpointA" />
        </sx:history>
        <sx:resolvedconflicts>
            <item>
                <sx:sync id="0a7903db47fb0ae8" version="3" deleted="false">
                    <sx:history when="Thu, 6 Jul 2006 20:27:22 GMT" by="endpointA">
                        <sx:update when="Thu, 6 Jul 2006 20:27:21 GMT" by="endpointA" />
                        <sx:update when="Thu, 6 Jul 2006 20:27:20 GMT" by="endpointA" />
                    </sx:history>
                </sx:sync>
                <title>This is a test title, modified by endpoint A</title>
                <description>This is a test item description.</description>
            </item>
        </sx:resolvedconflicts>
    </sx:sync>
    <title>This is a resolved test title </title>
    <description>This is a test item description.</description>
</item>
``` includes wired media such as a wired network or direct-wired connection, and wireless media such as acoustic, RF, infrared and other wireless media.

The computing device 1200 illustrated in FIG. 12, in its most basic configuration, includes at least one processing unit 1202 and memory 1204. In some implementations, the computing device 1200 may implement all or part of, for example, the service endpoint 410 or client endpoint 460 described previously with reference to FIG. 4. In some implementations, the processing unit 1202 may be a general purpose central processing unit (CPU), as exists, for example, on a variety of computers, including desktop and laptop computers. Depending on the exact configuration and type of computing device, the memory 1204 may be volatile (such as RAM), non-volatile (such as ROM, flash memory, etc.), or some combination of the two. This most basic configuration is illustrated in FIG. 12 by dashed line 1206. Additionally, the computing device 1200 may also have additional features and functionality. For example, the computing device 1200 may also include additional storage (removable and/or non-removable) including, but not limited to, magnetic or optical disks or tape. Such additional storage is illustrated in FIG. 12 by the removable storage 1208 and the non-removable storage 1210.

The computing device 1200 may also contain one or more communications connection(s) 1212 that allow the computing device 1200 to communicate with other devices and services. For example, the computing device might have one or more connections to other computing devices, including, for example, the endpoints described previously with reference to FIG. 1. The computing device 1200 may also have one or more input device(s) 1214 such as an image input devices like cameras or scanners, keyboards, mice, pens, voice input devices including microphone arrays, touch input devices, and so on. One or more output device(s) 1216 such as a display, speakers, printer, and so on, may also be included in the computing device 1200.

Those skilled in the art will appreciate that the technologies described herein may be practiced with computing devices other than the computing device 1200 illustrated in FIG. 12. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 12, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. A method, comprising:
receiving a first feed on a first endpoint associated with a first processor from a second endpoint associated with a second processor, wherein the first feed comprises a received item that includes a received item sync data element and a received item data element, the received item data element reflecting a change applied remotely to the received item data element;
merging the change to the received item data element communicated by the first feed with a local item in a data store associated with the first endpoint, wherein the merging comprises:
  determining that the received item is associated with the local item, wherein the local item includes a local item sync element and a local item data element, the local item data element reflecting a change applied locally to the local item data element by the first endpoint;
  identifying a conflict associated with the change applied remotely to the received item data element and the change applied locally to the local item data element; and
  comparing at least one element attribute of the received item sync data element with at least one other element attribute of the local item sync element to determine a winning item and a losing item from the received item and the local item;
generating a first update to the first feed from the items in the data store, wherein the first update to the first feed includes a conflict collection including conflict data describing the conflict;
receiving a second update to the first feed indicating that the conflict is resolved by a user;
generating a third update to the first feed by moving the conflict data from the conflict collection to a resolved conflict collection; and
communicating the third update to the first feed, including the conflict data in the resolved conflict collection, to the second end point or another remote endpoint.

2. The method of claim 1, further comprising:
creating a new local item by incorporating new item data for a newly received item into the data store when the newly received item is not associated with the local item.

3. The method of claim 1, further comprising:
generating a second updated feed that is accessible to a third endpoint that is different from the second endpoint, wherein the second updated feed is not accessible to the second endpoint and the second updated feed comprises at least a set of items from the data store that is different from a set of items comprised by the first feed.

4. The method of claim 1,
wherein the at least one element attribute comprises a received version attribute of the received item and the at least one other element attribute comprises a local version attribute of the local item, and wherein a larger version value of the received version attribute or the local version attribute is associated with the winning item.

5. The method of claim 1 wherein the first update to the first feed further comprises changes to items in the data store that were previously made by the first endpoint on behalf of a third endpoint that is not the same as the second endpoint.

6. The method of claim 1 wherein the first feed is received using an HTTP POST request that is initiated by the second endpoint.

7. The method of claim 1, further comprising:
communicating the first update to the first feed to the second endpoint by responding to an HTTP GET request initiated by the second endpoint.

8. The method of claim 1, further comprising:
performing a feed management operation.

9. The method of claim 8 wherein the feed management operation is one of: creating a second feed, deleting the second feed, and retrieving a list of feeds accessible from the first endpoint.

10. A method, comprising:
generating a feed on a client endpoint associated with a first processor, wherein the feed comprises a sync data element associated with a local item and an item data element associated with the local item;
communicating the feed to a service endpoint associated with a second processor; and
receiving a first updated feed from the service endpoint wherein the first updated feed comprises a conflict collection including a losing change data element, the losing change data element including information about a losing item;
performing, conflict resolution based on a user determination that the losing item correctly lost to a winning item that was in conflict with the losing item; and
generating a second updated feed based on the first updated feed by removing the losing change data element from the first updated feed, and including, in the second updated feed, a resolved conflict collection reflecting the conflict resolution.

11. The method of claim 10, further comprising:
making a change to data associated with the local item.

12. The method of claim 10, further comprising:
updating the local item using the first updated feed.

13. The method of claim 10 wherein the communicating operation further comprises an HTTP POST request initiated by the client endpoint that includes the feed.

14. The method of claim 10 wherein the receiving operation further comprises an HTTP GET request initiated by the client endpoint and wherein the service endpoint responds to the HTTP GET request with a response that includes the first updated feed.

15. The method of claim 11, further comprising:
modifying item data associated with the item data element so that the item data incorporates a change to the item data;
incrementing a version value associated with the sync data element;
creating a new update element associated with the sync data element and further associated with at least one of:
a previous most recent modification time and a previous most recent modifying entry; and
updating at least one of: a most recent modification time history attribute associated with the sync data element and a most recent modifying entity history attribute associated with the sync data element.

16. The method of claim 10, further comprising:
initiating a feed management operation.

17. The method of claim 16 wherein the feed management operation is one of: creating the second updated feed, deleting the second updated feed, and listing a set of feeds accessible using the service endpoint.

18. The method of claim 10, further comprising:
providing access credentials to the service endpoint, wherein the service endpoint only enables at least one of the following operations when the access credentials are known by the service endpoint and are associated with the enabled operation: the communicating operation and the receiving operation.

19. A first endpoint comprising a processor, the first endpoint being configured to:
generate a feed comprising a sync data element associated with a local item and an item data element associated with the local item;
communicate the feed to a second endpoint associated with a second processor;
receive a first updated feed from the second endpoint, wherein the first updated feed comprises a conflict collection including a losing change data element, the losing change data element including information about a losing item;
perform conflict resolution based on a user determination that the losing item correctly lost to a winning item that was in conflict with the losing item; and
generate a second updated feed based on the first updated feed by removing the losing change data element from the first updated feed, and including, in the second updated feed, a resolved conflict collection reflecting the conflict resolution.

20. The first endpoint according to claim 19, wherein:
the conflict collection comprises a date and time when the losing change data element was applied to the losing item; and
generating the second updated feed further comprises including, in the resolved conflict collection, the date and time when the losing change data element was applied to the losing item.

* * * * *

UNITED STATES PATENT AND TRADEMARK OFFICE
CERTIFICATE OF CORRECTION

PATENT NO. : 7,933,296 B2
APPLICATION NO. : 11/681321
DATED : April 26, 2011
INVENTOR(S) : Augustine et al.

Page 1 of 1

It is certified that error appears in the above-identified patent and that said Letters Patent is hereby corrected as shown below:

In column 37, line 23, delete "performing," and insert -- performing --, therefor.

Signed and Sealed this
Ninth Day of August, 2011

David J. Kappos
*Director of the United States Patent and Trademark Office*